United States Patent
Yamaguchi

(10) Patent No.: US 6,405,122 B1
(45) Date of Patent: Jun. 11, 2002

(54) METHOD AND APPARATUS FOR ESTIMATING DATA FOR ENGINE CONTROL

(75) Inventor: Masashi Yamaguchi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/324,554

(22) Filed: Jun. 2, 1999

Related U.S. Application Data

(63) Continuation-in-part of application No. 08/949,838, filed on Oct. 14, 1997, now Pat. No. 5,954,783.

(30) Foreign Application Priority Data

Jun. 2, 1998 (JP) .......................................... 10-152855

(51) Int. Cl.[7] .......................... F02D 41/14; G06F 15/18
(52) U.S. Cl. ...................... 701/106; 701/104; 701/109; 701/102; 706/27; 706/31
(58) Field of Search ............................... 701/106, 104, 701/109, 102; 706/19, 25, 31, 26, 27; 123/478, 480, 674

(56) References Cited

U.S. PATENT DOCUMENTS

| | | | |
|---|---|---|---|
| 4,535,736 A | 8/1985 | Taura et al. ................. | 123/344 |
| 5,200,898 A | 4/1993 | Yuhara et al. .............. | 701/106 |
| 5,247,445 A | 9/1993 | Miyano et al. ............. | 701/115 |
| 5,307,276 A | 4/1994 | Takahashi et al. .......... | 701/106 |
| 5,410,477 A * | 4/1995 | Ishii et al. ..................... | 701/48 |
| 5,524,599 A | 6/1996 | Kong et al. .................. | 123/682 |
| 5,539,638 A * | 7/1996 | Keeler et al. .................. | 701/29 |
| 5,568,799 A | 10/1996 | Akazaki et al. ............. | 123/480 |
| 5,638,492 A * | 6/1997 | Maeda et al. .................. | 706/45 |
| 5,642,722 A | 7/1997 | Schumacher et al. ....... | 123/673 |
| 5,682,317 A * | 10/1997 | Keeler et al. ................ | 701/101 |
| 5,755,212 A | 5/1998 | Ajima ......................... | 123/674 |
| 5,835,901 A * | 11/1998 | Duvoisin, III et al. ........ | 706/19 |
| 5,857,321 A * | 1/1999 | Rajamani et al. ........... | 60/39.27 |
| 5,954,783 A * | 9/1999 | Yamaguchi et al. ........ | 701/106 |

FOREIGN PATENT DOCUMENTS

| | | |
|---|---|---|
| EP | 959414 | * 11/1999 |
| JP | 06299892 | 10/1994 |
| JP | 10011106 | 1/1998 |

* cited by examiner

*Primary Examiner*—Willis R. Wolfe
*Assistant Examiner*—Hien T. Vo
(74) *Attorney, Agent, or Firm*—Knobbe, Martens, Olson & Bear LLP

(57) ABSTRACT

A data estimation capability using a FNN to estimate engine state data for an engine control system is described. The data estimation capability provides for making data relating to the engine state available as control parameters in a simple, inexpensive manner. The data estimation includes using data from one or more sensors as inputs to a FNN to estimate unmeasured engine operating states. The data estimates are provided as control parameters to an engine control system. The FNN can be used to provide data estimates for engine state values (e.g. the exhaust air fuel ratio, the exhaust $NO_x$ value, the combustion chamber temperature, etc.) that are too difficult or too expensive to measure directly. Each FNN can be configured using a genetic optimizer to select the input data used by the FNN and the coupling weights in the FNN. For example, the air/fuel ratio in the engine exhaust is estimated from the crank-angle acceleration, the crank angle, the engine speed, the air intake volume, the intake air vacuum, the ignition timing, the valve timing angle, and/or the EGR valve control; thereby eliminating the need for an $O_2$ sensor in the exhaust.

37 Claims, 30 Drawing Sheets

Block Diagram For Model-Based Control Unit

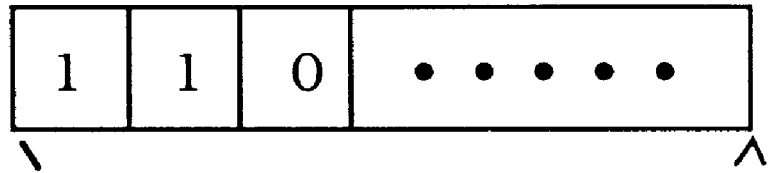

Display whether or not input candidate data is being used.
0: Not using as input data
1: Using as input data Candidate data used for FNN input 1. Average intake pressure in one process
2. Minimum intake pressure in one process
3. Maximum intake pressure in one process
4. Intake pressure at a specific crank angle
5. Changing time from minimum pressure to maximum pressure
6. Changing time from maximum pressure to minimum pressure
7. Difference between maximum pressure and minimum pressure
8. Amplitude of pulsation
9. Cycle of pulsation

*Figure 21*

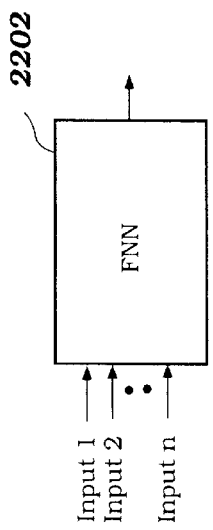
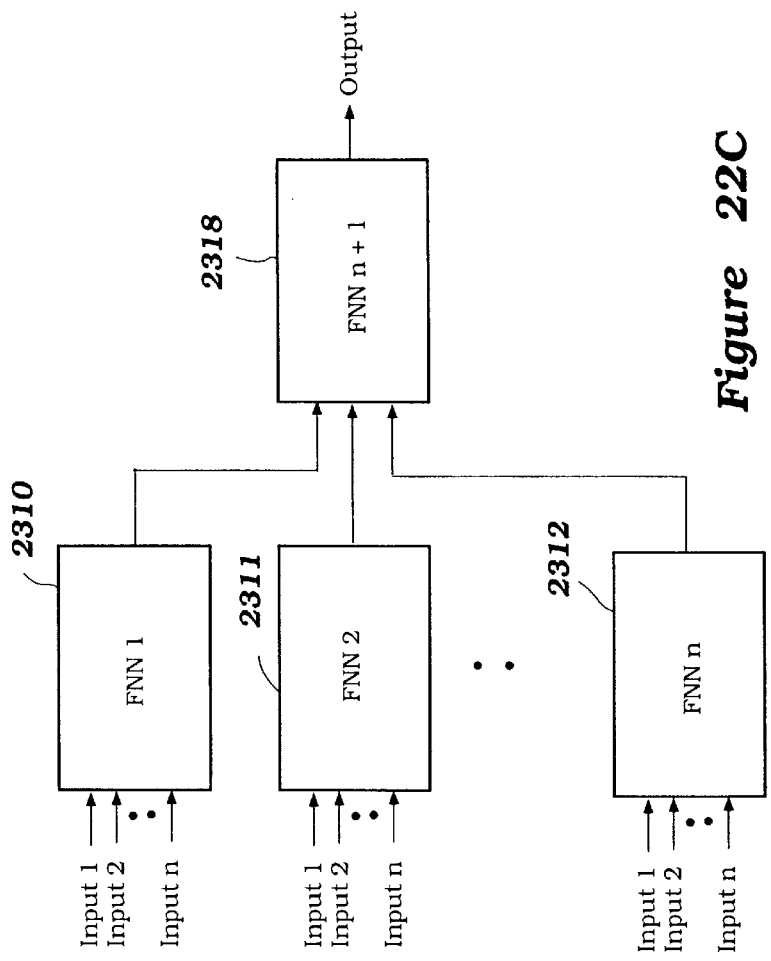
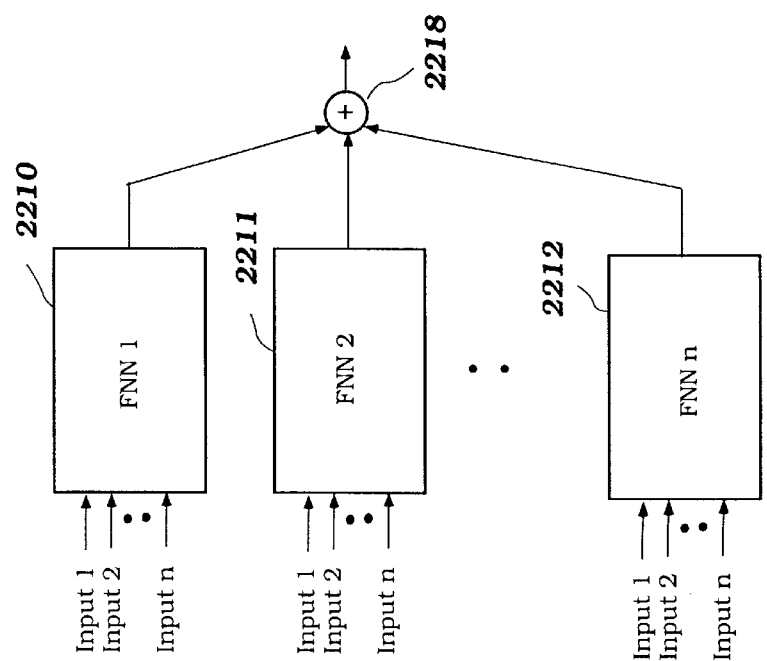
Figure 22A
Figure 22B
Figure 22C

METHOD AND APPARATUS FOR ESTIMATING DATA FOR ENGINE CONTROL

The present application claims foreign priority benefit of Japanese Application No. 10-152855, filed Jun. 2, 1998. The present application is a continuation-in-part of U.S. application Ser. No. 08/949,838 (now U.S. Pat. No. 5,954,783), titled "ENGINE CONTROL SYSTEM USING COMBINATION OF FORWARD MODEL AND INVERSE MODEL."

BACKGROUND OF THE INVENTION

1. Field of the Invention

The invention relates to a method for estimating the data for controlling a controlled plant such as an internal combustion engine.

2. Description of the Related Art

A Fuzzy Neural Network (INN), formed by combining a fizzy inference system and a neural network, possess the advantages of both a fuzzy inference system and a neural network. The fuzz inference system allows linguistically descriptive algorithms including obscurity, such as decisions by humans, using if-then type fuzzy rules. The neural network allows regulating an input-output relationship by updating coupling coefficients using a learning function.

The FNN allows, for example, modifying the shape of a membership function by using a learning method such as a back propagation method, wherein a membership function in the first-half portion of a fuzzy inference system is constructed using, for example, a sigmoid function; and the central value and the slope of the membership function of the first-half portion, as well as output of fuzzy rules, are made to correspond to weighting values for coupling in a neural network. When the number of fuzzy rules is too small, errors in output become large. On the other hand, when the number of fuzzy rules is too high, the probability of outputting appropriate values for inputs other than teacher data is reduced (decreased adaptability).

In a FNN, antecedent membership functions of the fuzzy reasoning set are realized with various functions including the sigmoidal function. Each membership function typically includes a center position, a slope, and outputs of fuzzy rules corresponding to coupling weights for the neural network. During training, the configurations of the membership functions are modified using learning methods such as back-propagation.

Because it can learn, the FNN can optimize output information even when the input information is incomplete, unobservable, or estimated. In these instances, selection of the appropriate inputs to achieve optimization of the desired outputs depends on the designer of the FNN. In other words, the designer typically selects the most suitable input information based on a presumption of the desired output information and the expected operating conditions.

For example, in a control system for an internal combustion engine, some desirable input quantities are either too expensive or too difficult to measure economically. One such quantity is the volume of airflow into the engine (i.e., the volume of the intake air charge to the cylinders). Measuring the input airflow usually requires an expensive sensor known as an airflow meter. Another such quantity is the adhesion rate of the fuel that adheres on internal walls of intake manifolds or the like. Another such quantity is the evaporation speed of the adhered fuel.

Control of an engine is generally practiced by using a plurality of sensors to detect the operating state of the engine. Typical sensor data includes the engine revolution speed, engine temperature, etc. The data collected by the sensors is provided as inputs to (control parameters) to engine control system.

There are various types of data relating to the operating state of the engine that can be used as control parameters. However, in many cases, not all of the data needed by the control system can be easily (or inexpensively) detected by the engine sensors. In some cases, the desired sensors are too expensive, too delicate, too unreliable etc. Moreover, in some cases too many sensors may be needed in order to sense every type of data desired for use as a control parameter.

For example, airflow meters and heat wire anemometers used for detecting the intake airflow rate are expensive, large, and vulnerable to salt damage; and therefore cannot be mounted on outboard motors. As another example, there is no inexpensive sensor capable of measuring the rate of fuel that is injected into the intake manifold by a fuel injector; and there is there is no inexpensive sensor capable of measuring the evaporation speed of fuel adhering to the walls of the intake manifold. While the torque variation produced by an engine can be measured using a torque sensor attached to the crankshaft of the engine, such a torque sensor is generally too expensive and too large to be a commercially useful item. While the combustion chamber temperature can be measured with a special thermometer in a laboratory, there is no sensor that is so small, inexpensive, and durable that it can be mounted on individual engines sold to consumers. Furthermore, while the intake manifold wall temperature can be measured by installing a sensor in the intake manifold, the temperature profile of the intake manifold changes according to the operating state of the engine, and the desired location for the intake manifold sensor changes with the operating state. Thus, to cover all operating states, several sensors are typically needed at various locations on the intake manifold.

While a sensor capable of detecting the exhaust air-fuel (A/F) ratio is available, it is expensive and prone to failure. Moreover, there is no simple, inexpensive sensor for measuring the A/F ratio near the ignition point of the sparkplug. A sensor for measuring the amount of $NO_x$ contained in the exhaust gas in a catalytic converter exists, but the sensor is large and expensive.

Finally, while it is desirable to optimizing engine performance to meet the expectations of a user (e.g., a driver), there is no sensor that can directly detect the state of the user. Therefore, the user must typically record his or her feelings for later use in evaluating and optimizing the performance of the engine. Clearly, it is difficult to control individual vehicles based on such sensory evaluation values, especially when real-time control is desired.

SUMMARY OF THE INVENTION

The present invention solves these and other problems by providing a method and apparatus for optimizing a FNN whereby input information, and combinations thereof, that are most useful for computing a desired control output are selected. In one embodiment, a FNN calculation process for fuzzy reasoning values includes a neural network structure. Output parameters are identified and computed by fuzzy reasoning using the neural network. An adjustment of fuzzy rules and/or membership functions is provided by a learning process. The learning process includes selecting candidate input data types (e.g. selecting sensors) that can provide input data for the fuzzy neural network. The input data is categorized and coded into chromosomes (individuals) for use by a genetic algorithm. The genetic algorithm is used to optimize the chromosomes, by evolving and selecting the individuals (chromosomes) that specify the number(s) and type(s) of input data for the FNN so as to optimize the operation of a controller that uses the FNN.

In one embodiment, the optimization method for the FNN also includes coding the coupling load corresponding to the FNN membership functions into the chromosomes, and evolving these individuals with the genetic algorithm using a desired fitness function.

In one embodiment, the optimized FNN is employed for control of an Internal Combustion Engine (ICE), and the candidate input data types include data relating to operation of the engine.

In one embodiment, the input "candidate" data types include an intake pressure. In one embodiment, the FNN output data includes an engine air intake volume. In one embodiment, the input candidate data types include a combustion chamber pressure, an engine speed (i.e. revolutions per minute), a fluctuation of the engine speed, and/or an air intake volume. In one embodiment, control output data includes torque fluctuations of the engine. In one embodiment, the candidate input data types include an intake manifold wall temperature, an ambient temperature of the intake manifold, and/or elapsed time from engine start. In one embodiment, output data includes a combustion chamber temperature of the engine.

In one embodiment, candidate input data includes an engine coolant (e.g. water) temperature, an oil temperature, and/or an engine temperature. In one embodiment, output data includes an intake manifold wall temperature.

In one embodiment, the candidate input data includes the intake manifold wall temperature, the engine speed (revolutions), the air intake volume and/or the intake air pressure (including pressures below ambient). In one embodiment, output data includes, an evaporation time constant for fuel injected into the intake manifold.

In one embodiment, candidate input data includes the engine speed, the air intake volume and/or the intake air pressure. In one embodiment, the output data includes a flow rate and a timing of the fuel injected into the intake manifold.

In one embodiment, candidate input data includes a fluctuation rate of a throttle angle and/or a fluctuation rate of the engine speed.

The present invention also provides a data estimation capability for controlling engines. The data estimation capability provides for solving the above-described problems associated with data detection in an engine and for making data relating to the engine state available as control parameters in a simple, inexpensive manner. The data estimation includes using data on at least the state of the engine as control parameters. The control parameters are estimated by one or more fuzzy neural networks using input information different from the control parameters.

In one embodiment, the A/F ratio of the engine exhaust is estimated from at least one of the following parameters: a crank-angle acceleration, a crank angle, an engine speed, an air intake volume, an intake an air negative pressure (vacuum), an ignition timing, a valve timing angle, and/or an Exhaust Gas Recirculator (EGR) valve control.

In one embodiment, the A/F ratio of the engine exhaust is estimated from data such as the exhaust gas temperature, the atmospheric temperature, the engine speed, the air intake vacuum, the throttle valve opening angle, and/or the ignition timing.

In one embodiment, the A/F ratio of the engine exhaust is estimated from data such as the engine speed, the throttle angle, the fuel injection volume, the fuel injection timing, the ignition timing, and/or the valve timing.

In one embodiment, the $NO_x$ content of the engine exhaust is estimated from data such as the engine speed, the throttle angle, the coolant temperature, the exhaust gas temperature at an input to the catalytic converter, the exhaust gas temperature at an output of the catalytic converter, the distance traveled, the A/F ratio (measured or estimated), etc.

In one embodiment, user feedback is estimated from physiologic data such as pulse, heart rate, blood pressure, breathing interval, electro-encepholograph (EEG), etc.

BRIEF DESCRIPTION OF THE DRAWINGS

These and other features of the invention will now be described with reference to the drawings in which

FIG. 21 shows a portion of a chromosome structure for encoding coupling coefficients of the FNN, as genetic information.

FIGS. 22A–22C illustrates neural network topologies.

Figure 1:
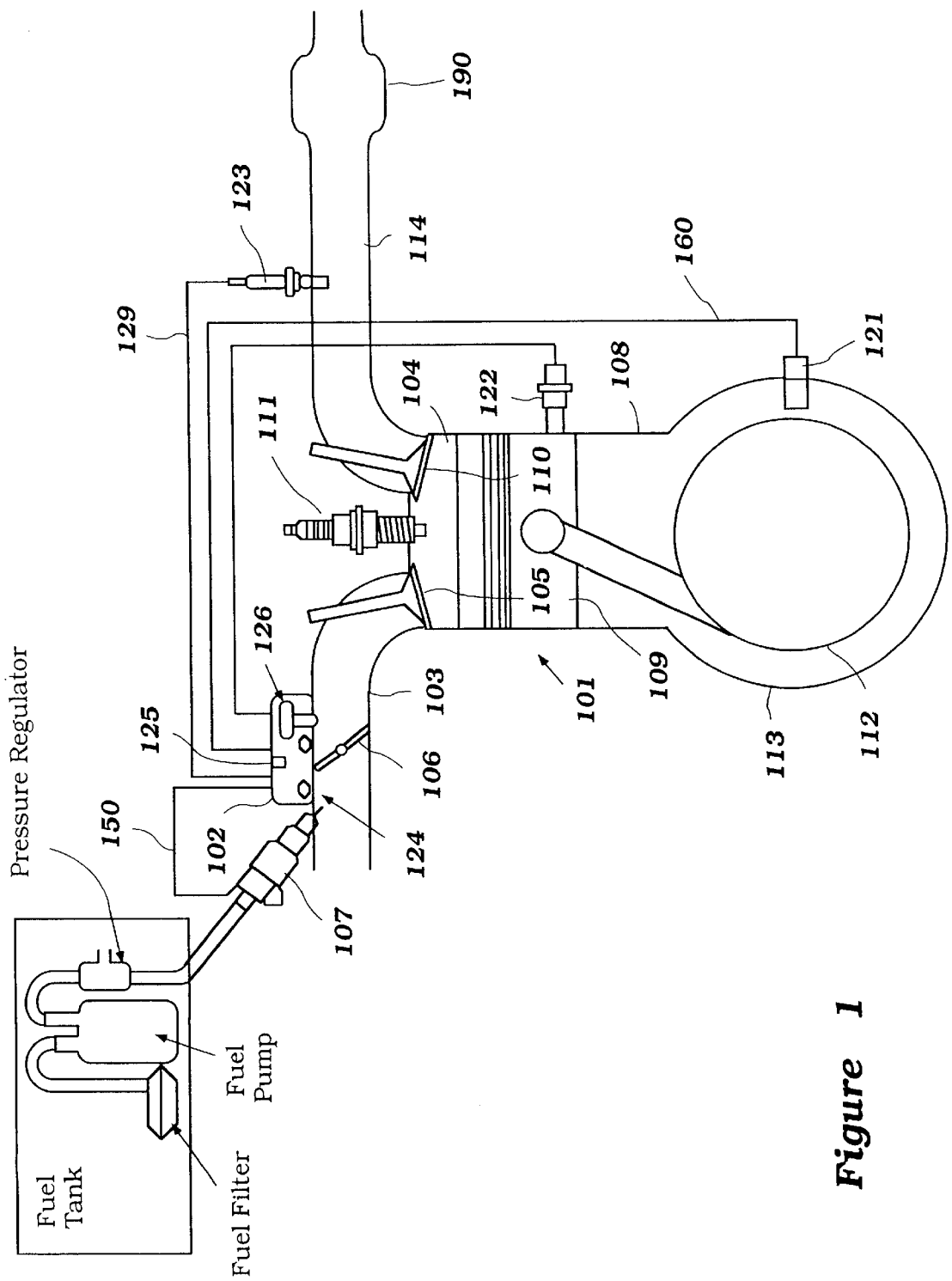
FIG. 1 is a schematic diagram showing an engine, a FNN-based control device that is provided with a genetically optimized FNN for realizing a control of the air/fuel ratio in the engine exhaust

In the drawings, like reference numbers are used to indicate like or functionally similar elements. The first digit of each three-digit reference number generally indicates the figure number in which the referenced item first appears. The first two digits of each four-digit reference number generally indicate the figure number in which the referenced item first appears.

DETAILED DESCRIPTION OF THE PREFERRED EMBODIMENT

FIG. 1 illustrates, schematically, an engine 101, and a control system 102 that uses a FNN for realizing control of the Air/Fuel (A/F) ratio in the engine 101.

The engine 101 operates on a four-stroke principle. The engine 101 has an air intake manifold 103 that admits air into a combustion chamber 104 through an intake valve 105. A throttle valve 106 is provided in the air intake manifold 103 to control the volume of airflow. The intake manifold 103 is also provided with a fuel injection device (fuel injector) 107 that injects pressurized fuel into the air intake manifold 103. The air is mixed with the injected fuel and the air/fuel mixture introduced into the combustion chamber 104. The combustion chamber 104 is defined by a cylinder block 108, a cylinder head, a piston 109 that reciprocates within the cylinder block 108, the intake valve 105 and an exhaust valve 110. A spark plug 111 is provided at the cylinder head so as to be exposed into the combustion chamber 104. The spark plug 111 is fired to burn the mixture in the combustion chamber 104 to push down the piston 109 and thereby rotate a crankshaft 112 that is connected with the piston 109 and positioned in a crankcase 113. Burnt mixture is discharged through the exhaust valve 110 and the exhaust manifold 114 as emission The engine exhaust can be run through an optional catalytic system (catalytic converter) 190.

An optional exhaust gas recirculation (EGR) system (not shown) can be used to route some of the exhaust gasses back into the input manifold. The amount of gas recirculated is controlled by an EGR valve.

The ratio of the air versus fuel, also known as the A/F ratio, is an important factor for achieving good combustion performance and low emissions. The control system 102 is a device for controlling the A/F ratio by changing the amount of fuel injected by the fuel injector 103 in response to openings of the throttle valve 106. If the air fuel ratio is kept in an appropriate range, combustion of the Air/Fuel mixture and emissions are also maintained in a desired state.

The control system 102 can be, as shown in FIG. 1, mounted on the air intake manifold 103. Sensors for sending signals associated with sensed conditions to the control system 102 are provided at appropriate places on the engine 101. Some of the sensors include: a crank angle sensor 121 attached at the crankcase 113; an engine temperature sensor 122 attached at the cylinder block 108; and an A/F ratio sensor 123 attached at the exhaust manifold 114. The crank angle sensor 121 provides a crank angle signal 160 to the control system 102. The A/F sensor 123 provides an A/F signal 129 to the control system 102.

The A/F ratio sensor 123 is preferably an oxygen ($O_2$) sensor and can be attached at the cylinder block 108 or the cylinder head so as to be exposed to the combustion chamber 104.

Other sensors include: an intake manifold vacuum (negative pressure) sensor 124, an atmospheric temperature sensor 125; and an air intake manifold inner wall temperature sensor 126. Outputs from the sensors 124, 125 and 126 are provided to inputs of the control system 102.

An injector signal 150 output from the control system 102 is provided to the fuel injector 103 to control the amount of fuel injected by the fuel injector 103. In response to the injector signal 150, the fuel injector 103 injects the specified amount of fuel into the air intake manifold 103. A first embodiment of the control system 102 is described in the text below in connection with FIGS. 2–16. A second embodiment of the control system 102 is described in the text below in connection with FIGS. 17–25.

Figure 2:
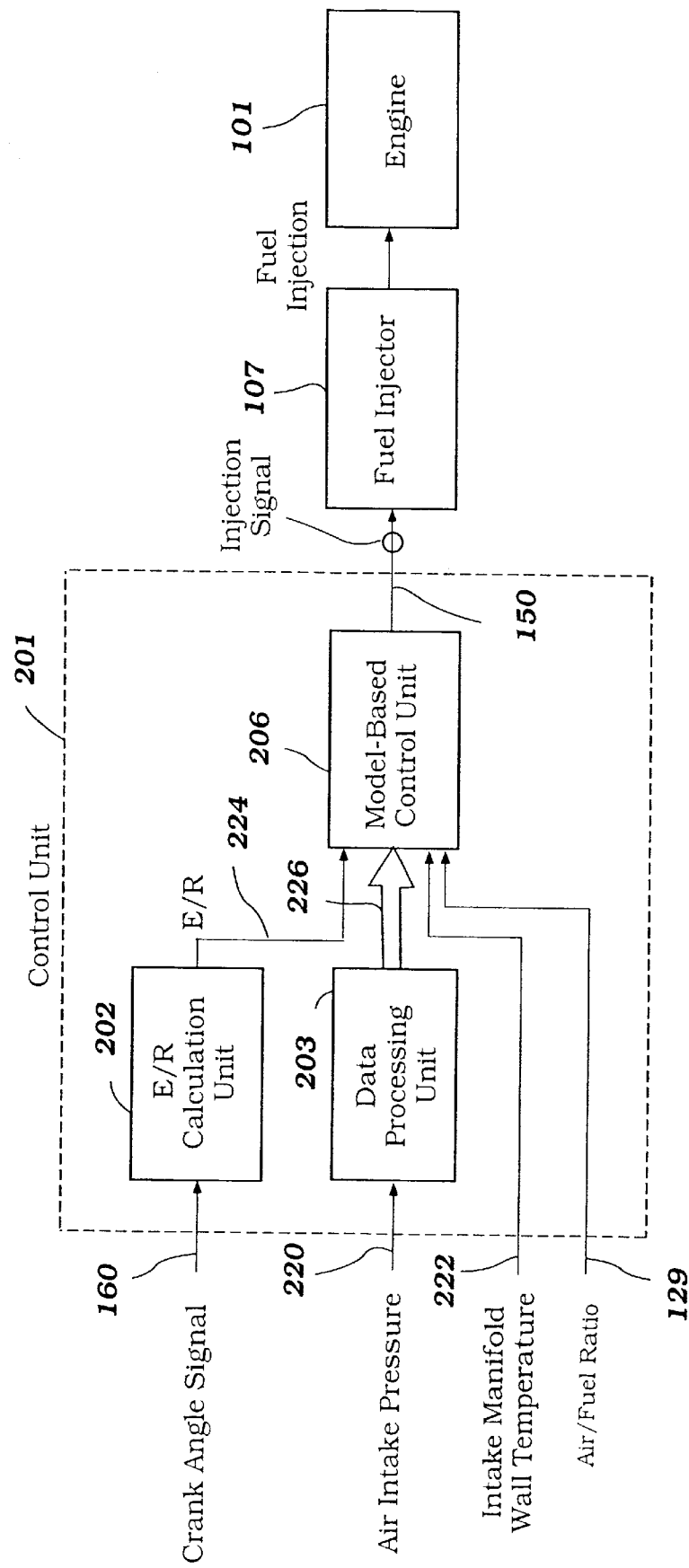
FIG. 2 is a block diagram showing a first engine control system.

FIG. 2 is a block diagram showing a control system 201 as a first embodiment of the control system 102. The control system 201 comprises an engine speed module 202, a pressure data module 203 for transforming air intake pressure data, and a model-base control module 206. The engine speed calculation module 202 calculates engine speeds based upon the crank angle signal 160 by comparing a crank angle signal with time. The pressure data module 203 transforms the intake pressure signal 220 (provided by the air intake manifold vacuum sensor 124) into a group of pressure signals 226. The model-based control module 206 accepts the engine speed signal 224, the pressure signals 226, the intake manifold (inner) wall temperature signal 222, and the A/F ratio signal 129. An output of the model-based control module 206 is the injector signal 150.

Figure 3:
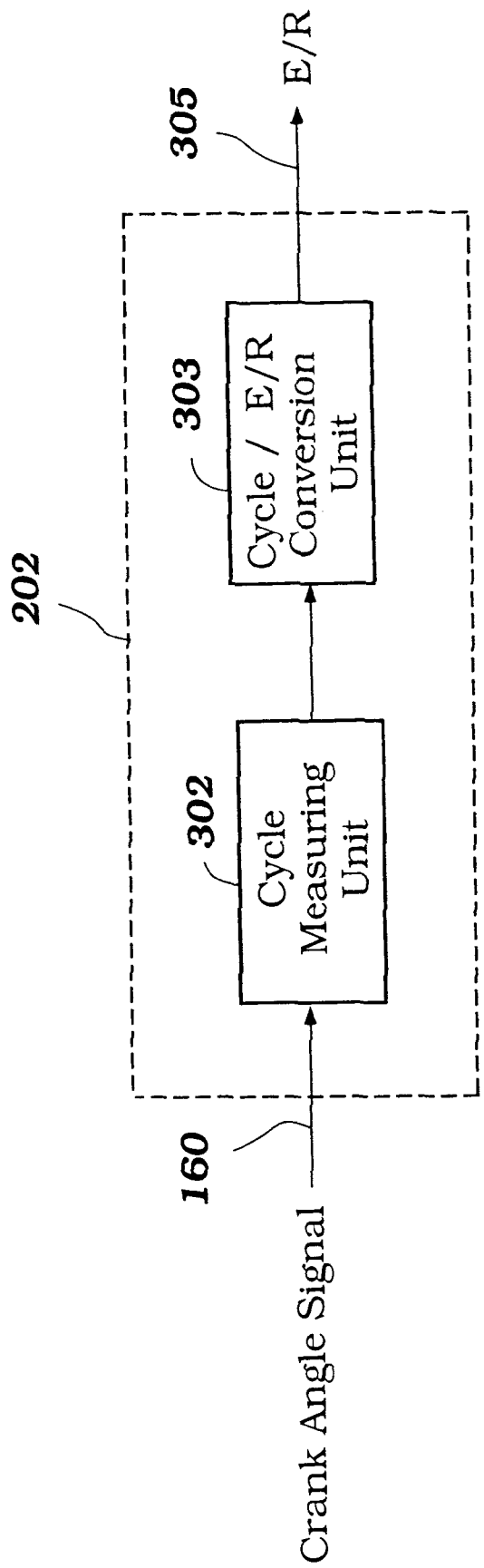
FIG. 3 is a block diagram showing an engine speed module for calculating engine speed from data provided by a crank angle sensor.

FIG. 3 is a block diagram of the engine speed module 202 shown in FIG. 2. The engine speed module 202 includes a cycle module 302 for detecting the crank angle signal 160 and an E/R calculator module 303 for converting the measured cycle signal into an Engine Rotation (E/R) speed signal E/R 305.

Figure 4:
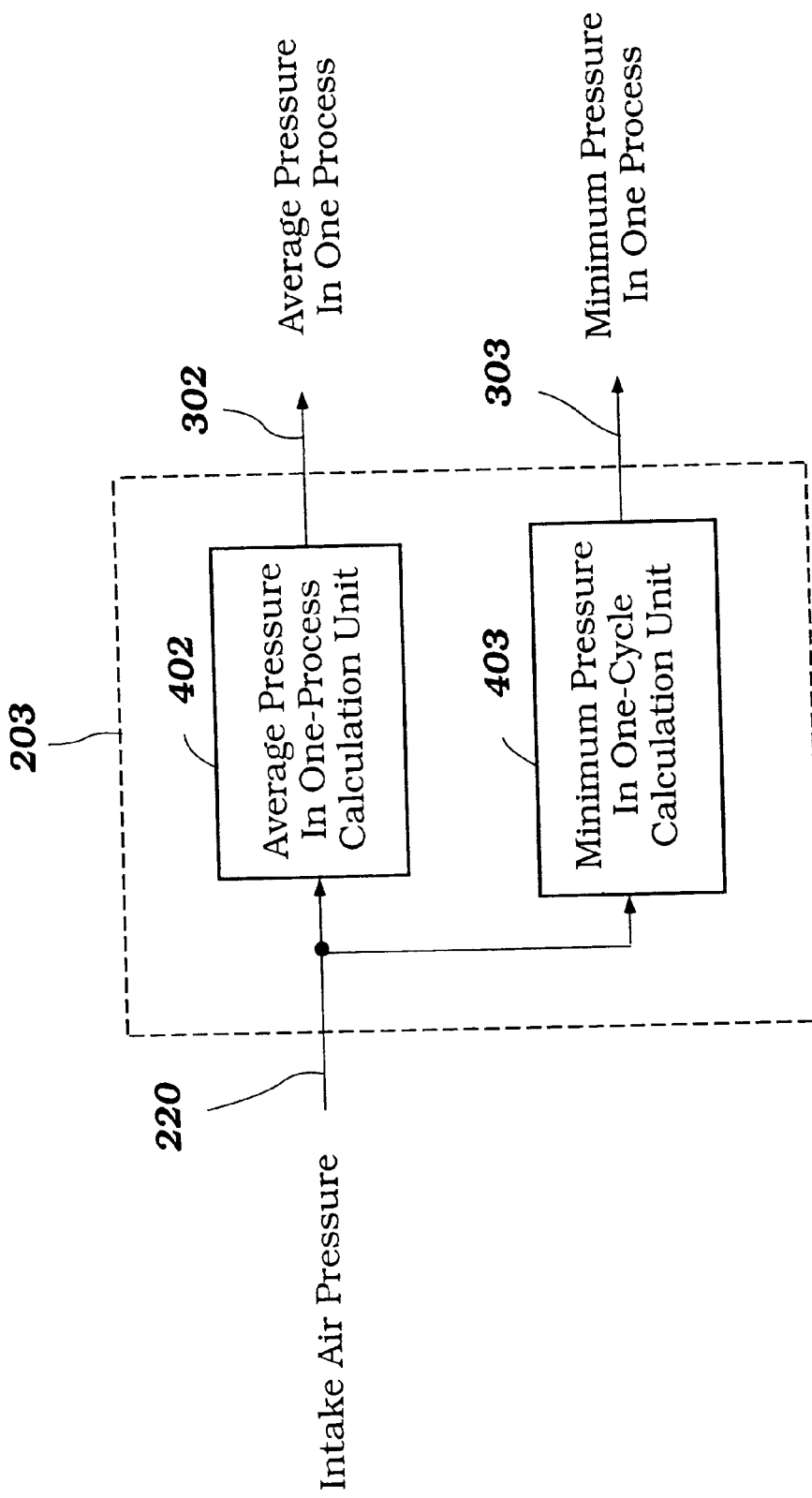
FIG. 4 is a block diagram showing a transform module for transforming pressure data, for use in the control system shown in FIG. 2.

FIG. 4 is a block diagram of the pressure data module 203 shown in FIG. 2. The pressure data module 203 includes an averaging module 402 for calculating an average pressure per stroke and a minimum pressure module 403 for detecting the minimum pressure per stroke. The intake air pressure signal 220 is provided to an input of the averaging module 402 and to an input of the minimum pressure module 403. An average pressure signal 302 is provided by an output of the average pressure module 402. A minimum pressure signal 303 is provided by an output of the minimum pressure module 403.

Figure 5:
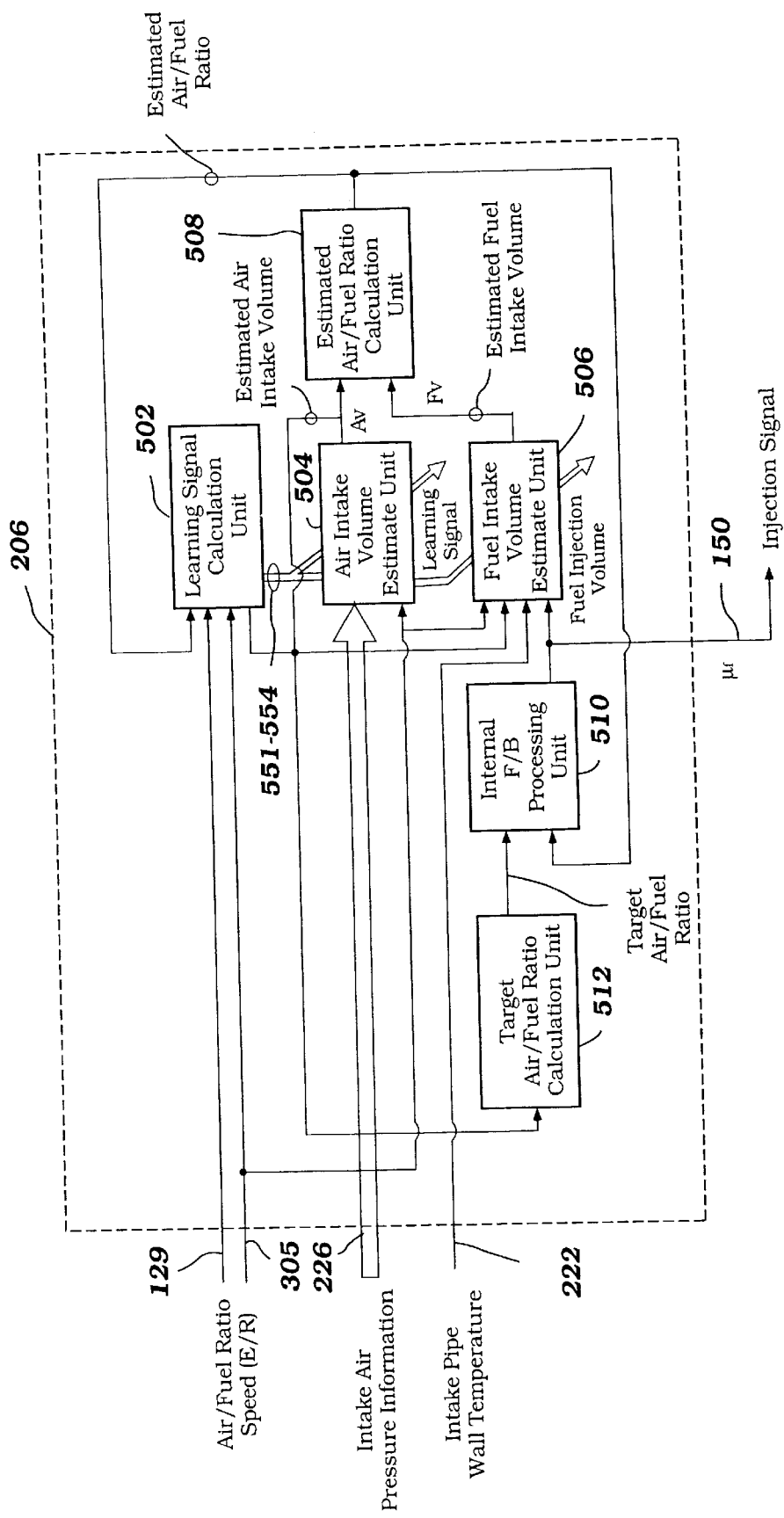
FIG. 5 is a block diagram showing a model-based control system for use in the engine control system shown in FIG. 2.

FIG. 5 is a block diagram of the model-based control module 206 shown in FIG. 2. The model-based control module 206 includes a learning module 502, an air intake volume estimator 504 (also known as an intake forward model 504), a fuel volume estimator 506, an A/F estimator 508, a feedback module 510 and a target A/F ratio module 512.

The intake air estimator 504 is a forward model of the air charge system that is based on the behavior of the airflow in the air intake manifold 103. The intake air estimator 504 accepts the pressure signals 226 and the E/R signal 305 and provides a estimated air volume. The fuel volume estimator 506 is a forward model of the fuel system and is based on behavior of the fuel injected into the air intake manifold 103 by the fuel injector 107. The fuel volume estimator 506 accepts the E/R signal 305, the estimated intake air signal 504, the intake manifold wall temperature signal 222, and the injector control signal 150; and provides an estimated A/F ratio signal.

The A/F estimator 508 accepts the estimated intake air volume signal and them estimated fuel intake volume signal and provides the estimated air fuel ratio signal. The target A/F module 512 accepts the estimated intake air volume signal and provides a target A/F ratio signal. The feedback module 510 accepts the target A/F ratio signal and the estimated A/F ratio and produces the injection signal 150.

The learning module 502 accepts the A/F ratio signal 129 provided by the air fuel ratio sensor 123, the E/R signal 305, the estimated intake air volume signal, and the estimated A/F ratio signal; and provides learning data signals 551–554 to a learning input of the air intake volume estimator 504 and to a learning input of the fuel intake volume estimator 506.

Figure 6:
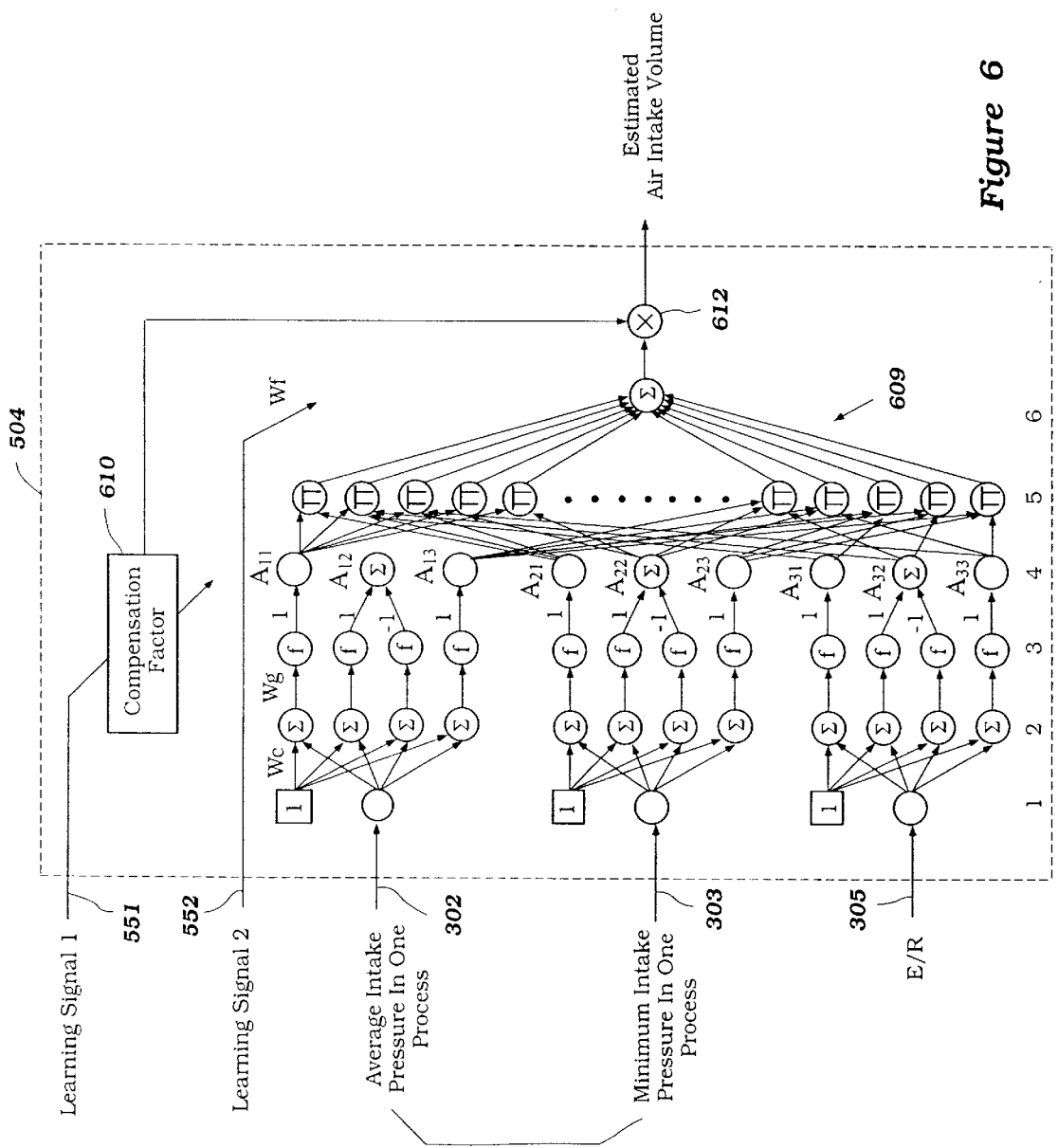
FIG. 6 is a block diagram showing a module for calculating an estimated intake air volume for use in the model-based control system shown in FIG. 5.

FIG. 6 is a block diagram of the intake air volume estimator 504. The intake air volume estimator 504 includes a FNN 609. The FNN 609 accepts data associated with operational states of the engine 101, including, an average pressure signal 302 (the average pressure per stroke), and a minimum pressure signal 303 (indicating the minimum pressure per stroke).

The FNN 609 has a stratified (layered) architecture with six processing strata. The first four strata are antecedent parts. The fifth and sixth strata are consequent parts.

The respective input signals 302, 303, and 305 are each provided to a plurality of membership functions that are defined with the sigmnoid equation as follows:

$$F(x)=1/[1+\exp\{-w_g(x_i+w_c)\}]$$

That is, the membership functions are expressed with the sigmoidal functions where the parameter $w_c$ represents the center position and the parameter $w_g$ represents the slope of the sigmoidal functions. The parameter $w_c$ and the parameter $w_g$ are inserted into the neural network as its coupling coefficients.

Further, the consequent parts are allotted to fuzzy rules corresponding to the number of the membership functions of the antecedent parts. Respective outputs of these fuzzy rules are indicated with the coupling coefficient(s) $w_f$. The coupling coefficients $w_f$ and the grades of the antecedent membership functions corresponding to the respective coupling coefficient $w_f$ are multiplied and then summed together. The calculated value is outputted as the estimated value by the method of elastic center, i.e., estimated intake air amount.

As described above, the FNN 609 is a hierarchical FNN composed of six strata (layers), wherein layers from a first layer through a fourth layer constitute a first portion, and layers from a fifth layer to a sixth layer constitute a second portion of the network.

In one embodiment, at the first portion, the average intake pressure signal 302 has three membership functions, A11, A12, and A13. The minimum intake pressure signal 303 has three membership functions A21, A22, and A23. The E/R signal 305 has three membership functions A31, A32, and A33. Input domains at the second portion (i.e., input at the fifth layer) are divided into one or more fuzzy rule domains.

In FIG. 6, $w_c$, $w_g$, $w_f$, "1", and "−1" indicate coupling loads between units represented by circles. The units represented by squares at the first layer indicate bias units which constantly output a value 1.0 (one).

Each of the units at the third layer has a sigmoid function, which shapes the membership functions at the first-half portion.

In the FNN 609, the average intake pressure 302, the minimum intake pressure 303, and the E/R (engine speed) 305 are provided to the respective units at the first layer. The coupling loads $w_c$ are added as a bias at the second layer. An input of each unit at the third layer is obtained by multiplying the corresponding output of the unit at the second layer by the corresponding $w_g$. Thus, the output of the unit at the third layer is expressed as follows:

$$f(x)=1/(1+\exp(-w_g(x_i+w_c)))$$

In the above, $x_i$ is $x_1$, $x_2$, or $x_3$. The coupling loads $w_g$ and $w_c$ are parameters for determining the slope and the central value of the sigmoid functions. The coupling loads $w_g$ and $w_c$ are set at appropriate values for each sigmoid function, as a result of learning provided by the learning signal 552.

Accordingly, at the output of the fourth layer, membership functions A11, A12, A13, A21, A22, A23, A31, A32, and A33 can be obtained at the first-half portion, which cover certain ranges of engine speeds and pressures.

In the above, membership functions, A11, A12, and A13 denote that the average intake pressure 302 is in a "low range!", "intermediate range", and "high range", respectively. Functions A21, A22, and A23 denote that the minimum intake pressure 303 is in a "low range", "intermediate range", and "high range", respectively. Functions A31, A32, and A33 denote that the engine speed E/R 305 is "slow", "medium", and "fast", respectively.

In this example, at the second-half portion, 18 fuzzy rules (3×6=18) are generated, and at the fifth layer, adaptability for each fuzzy rule is calculated based on the grade of the membership functions at the first-half portion.

The fuzzy rules are determined for each combination of the membership function of the engine speed at the first portion and the membership function of the pressures at the first portion as follows: "if engine speed is membership function $A_{3n}$ (n=1 ... 3) at the first portion, and average pressure is membership function $A_{1n}$ (n=1 ... 3), and minimum pressure is membership function $A_{2n}$ (n=1 ... 3); then x is coupling load $w_f$." That is, each coupling load $w_f$ is a parameter that indicates an output of a fuzzy rule. Each coupling load $w_f$ is set at an appropriate value through leading, e.g., "when engine speed is in a high range, and average pressure intermediate, and minimum pressure is intermediate: then x volume $w_f$ is 50% ", or "when engine speed is in a low range, average pressure intermediate, and minimum pressure is intermediate: then x volume $w_f$ is 70%. " At the sixth layer, the sum of adaptability for each fuzzy rule at the first-half portion, which is calculated at the fifth layer, and coupling load $w_f$, which means output of the fuzzy rule, is integrated. This integrated sum is an estimated value of x (where x is the unscaled estimated air intake volume).

The estimated air intake volume is obtained by multiplying the unscaled estimated air intake volume x by a compensation factor provided by a compensation factor module 610. The leaning signal 551 is provided to a learning input of the compensation factor module 610.

The number and variety of the inputs to the FNN 609, the coupling coefficients $w_c$ representing the center positions of the membership functions, the coupling coefficients $w_g$ representing the slopes of the membership functions and the number of the membership functions corresponding to the respective inputs are associated with genes of a chromosome structure described below in connection with FIG. 8. The FNN 609 is optimized (trained) by using a genetic algorithm to search for an optimal chromosome.

Figure 7:
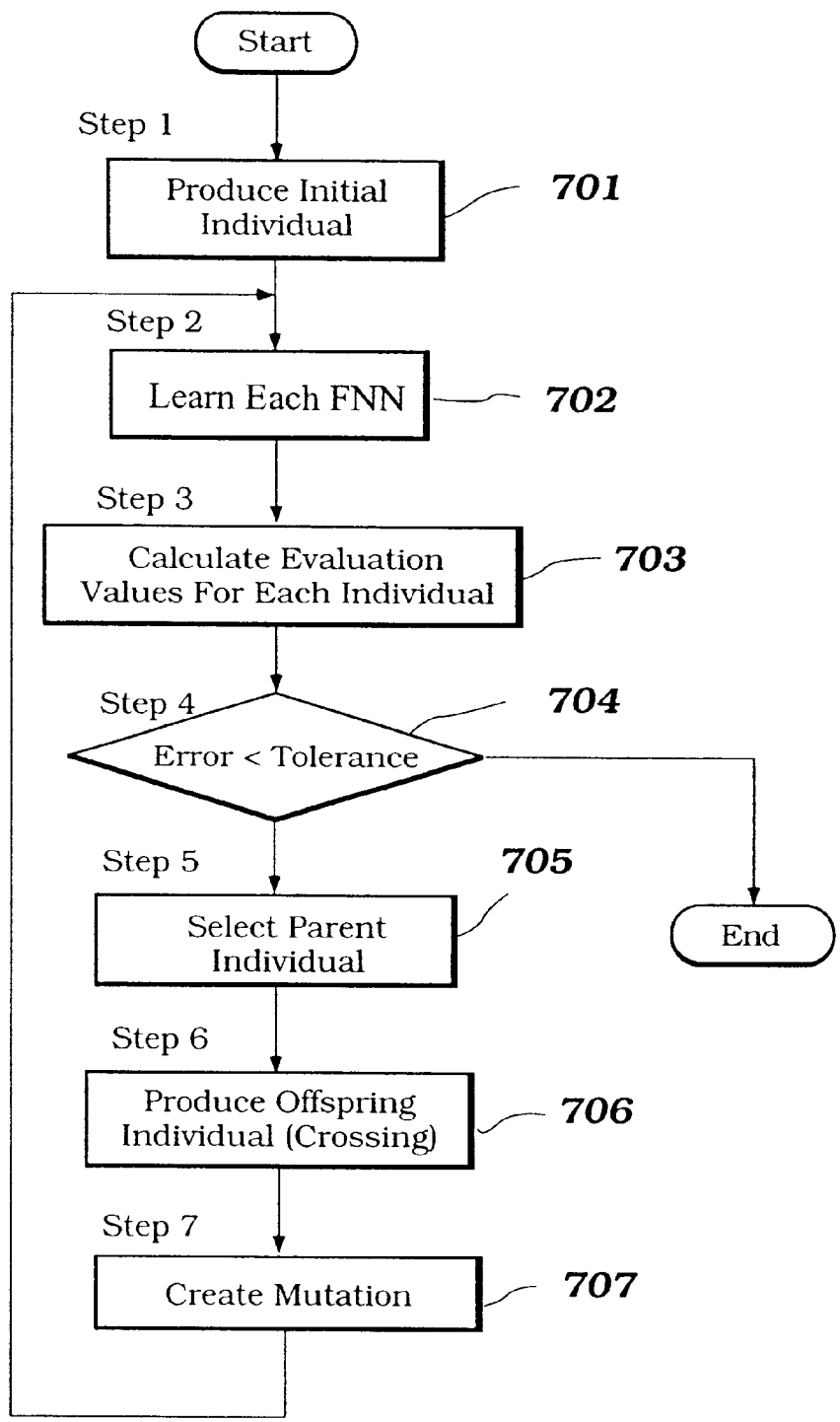
FIG. 7 is a flowchart showing optimization of a FNN using a genetic algorithm.

FIG. 7 is a flowchart showing optimization of a FNN, such as the FNN 609. using a genetic algorithm. The flowchart begins at a process block 701 where an initial set of chromosomes (each chromosome representing an individual) is produced. The process then proceeds to a process block 702 where each chromosome (individual) is used to train the FNN. After training, the process advances to a process block 703 where a genetic fitness function (an evaluation function) is calculated for each individual using the FNN as trained for that individual. After computing the fitness functions, the process advances to a process block 704 where the values produced by evaluating the fitness functions are compared to a tolerance value. If an individual chromosome is found that provides a desired tolerance, then that chromosome is selected as the optimum chromosome and the genetic optimization exits. If no suitable individual is found, the process advances to a process block 705 where the best individuals are selected to be parents for the next generation of chromosomes. After selecting the parents, the process advances to a process block 706 where offspring are calculated by crossing genes between the parent chromosomes. After crossing, the process advances to a process block 707 where mutations are introduced into the chromosomes. After mutating the genes, the process jumps back to the process block 702 to evaluate the new generation of chromosomes.

Figure 8:
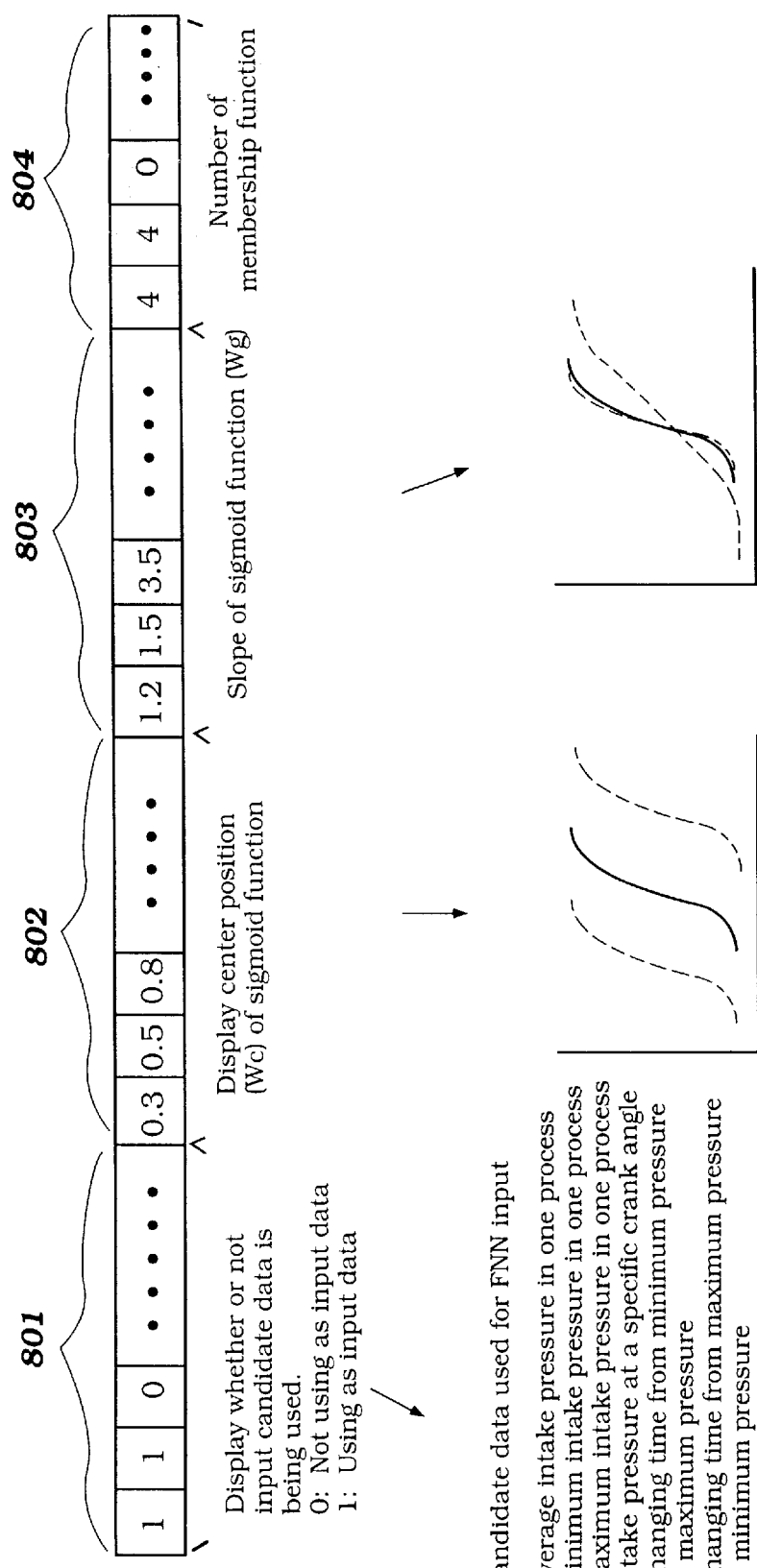
FIG. 8 shows an example of a chromosome that has coupling coefficients of the FNN encoded as genetic information (genes), so that the optimal coupling coefficients can be optimized using a genetic algorithm.

FIG. 8 shows an example of a chromosome that has coupling coefficients of the FNN encoded as genetic information (genes), so that the optimal coupling coefficients can be found using a genetic algorithm. FIG. 8 shows a chromosome configured as a first gene group 801, a second gene group 802, a third gene group 803, and a fourth gene group 804. Each group has nine genes, where each of the nine genes corresponds to a particular type of engine data as listed below:

1. Average intake pressure in an engine stroke.
2. Minimum intake pressure in an engine stroke.
3. Maximum intake pressure in an engine stroke.
4. Intake pressure at a specific crank angle.
5. Time interval between minimum pressure to maximum pressure.
6. Time interval between maximum pressure to minimum pressure.
7. Difference between maximum pressure and minimum pressure.
8. Amplitude of pulsation.
9. Cycle of pulsation.

Genes in the first group are binary genes that indicate whether or not that input type is used, a zero indicating that the input is not used, a one indicating that the input is used. Genes in the second group 802 contain the center position $w_c$ of a sigmoid function in the FNN. Genes in the third group 803 contain the slope $w_g$ of the sigmoid function in the FNN. Genes in the fourth group 804 contain the number of the membership function for the corresponding $w_c$ and $w_g$.

As shown in FIG. 8, the number and types of input information in the FNN used in the air intake rate estimation section, the coupling weights $w_c$ and $w_g$ representing the central position and the slope of each membership function, and the number of the membership functions are coded as genes to produce a first generation chromosomes consisting of a plural number (e.g., 100) of individuals.

The chromosome structure shown in FIG. 8 is used in connection with the algorithm shown in FIG. 7 to optimize a FNN. A number of input candidate data types for use as the input information to the FNN are prepared in a first step (processing block) 701. The data denoting whether the input candidate is used or unused (where "0" denotes unused and "1" denotes used) is coded as genes in the gene group 801 as shown in FIG. 8. For example, the candidate input data types for estimating the intake air rate can include: the average intake air pressure per stroke, the minimum intake air pressure per stroke, the maximum intake air pressure per stroke, the intake air pressure at a specific crank angle, the period of time in which the intake air pressure change from the maximum to the minimum, the differential pressure between the minimum and the maximum pressures, the intake air pulsation amplitude, the period (frequency) of the intake air pulsations, etc. The desired (optimal) data used for controlling the engine is selected as part of the optimization process provided by the selection mechanism of the genes in the gene group 801. Data types which are easy (or inexpensive) to measure (e.g., crankshaft angle, temperatures, pressures, etc.) are provided as input to the optimization process. The optimization process selects the most useful input data types and, in one embodiment, trains the various fuzzy neural networks to estimate other data types that are not so easy to measure (e.g., A/F ratio, $NO_x$ content, etc.).

The information number, coded as a gene, of the membership functions is prepared so as to correspond to the input information. The input information and the coupling factor of the FNN are fixed with one of the individual chromosomes produced in the first step (process block) 701 and the estimated value of the intake air rate is estimated by the FNN. The actual intake air rate is detected with a sensor such as an airflow meter, and learning (evaluation) of the weights $w_f$ is carried out for a specific number of iterations with the back propagation function (BP) method so as to reduce the difference between the estimated and the measured value.

After applying the process of the step 702 to all of the individuals, an evaluation function is used to compute an evaluation value according to the error between the estimated and measured values for each of the individuals (step 703).

After calculating the evaluation values for all of the individuals, determination is made as to whether the error of the individual of the highest evaluation (the elite individual) is smaller than a tolerance value (step 704). If the error is smaller than the tolerance value, the FNN is considered to be optimized and the optimization process is ended. The input information and the coupling factor of the FNN are set using the genes of the elite individual.

If the error is greater than the tolerance value as determined in step 704, then the FNN is determined not to be optimized and two parent individuals are selected from the first generation individuals to produce the next generation of individuals (step 705). In one embodiment, the parent individuals are randomly selected from the first generation using a weighted selection method, wherein the individuals having a higher evaluation value (less error) are more likely to be chosen.

When the parent individuals are selected, the selected parent individuals are made to cross each other to reproduce a plural number of child individuals as the second generation (step 706). The mutual crossing of the parent individuals may be carried out by methods such as one-point crossing, two-point crossing, normal distribution crossing and the like. The number of individuals created for the second generation is one less than the number of individuals used in the first generation. The elite individual from the first generation is then added to the second generation so that the second generation has the same number of individuals as the first generation. (Leaving the previous generation elite individual intact to the next generation often reduces the time needed for the optimization.)

In the step 707, mutations are introduced into the genes by changing the values of the genes at random using a desired probability for the plural number of child individuals produced in step 706.

After introducing mutations, the process returns to step 702 and the second generation is used to train each FNN. The steps 702–707 are repeated until the error between the estimated value (output from the FNN) and the measured value becomes smaller than the tolerance value. As a result, the input information and coupling factors most suited for estimating the desired output are determined.

Figure 9:
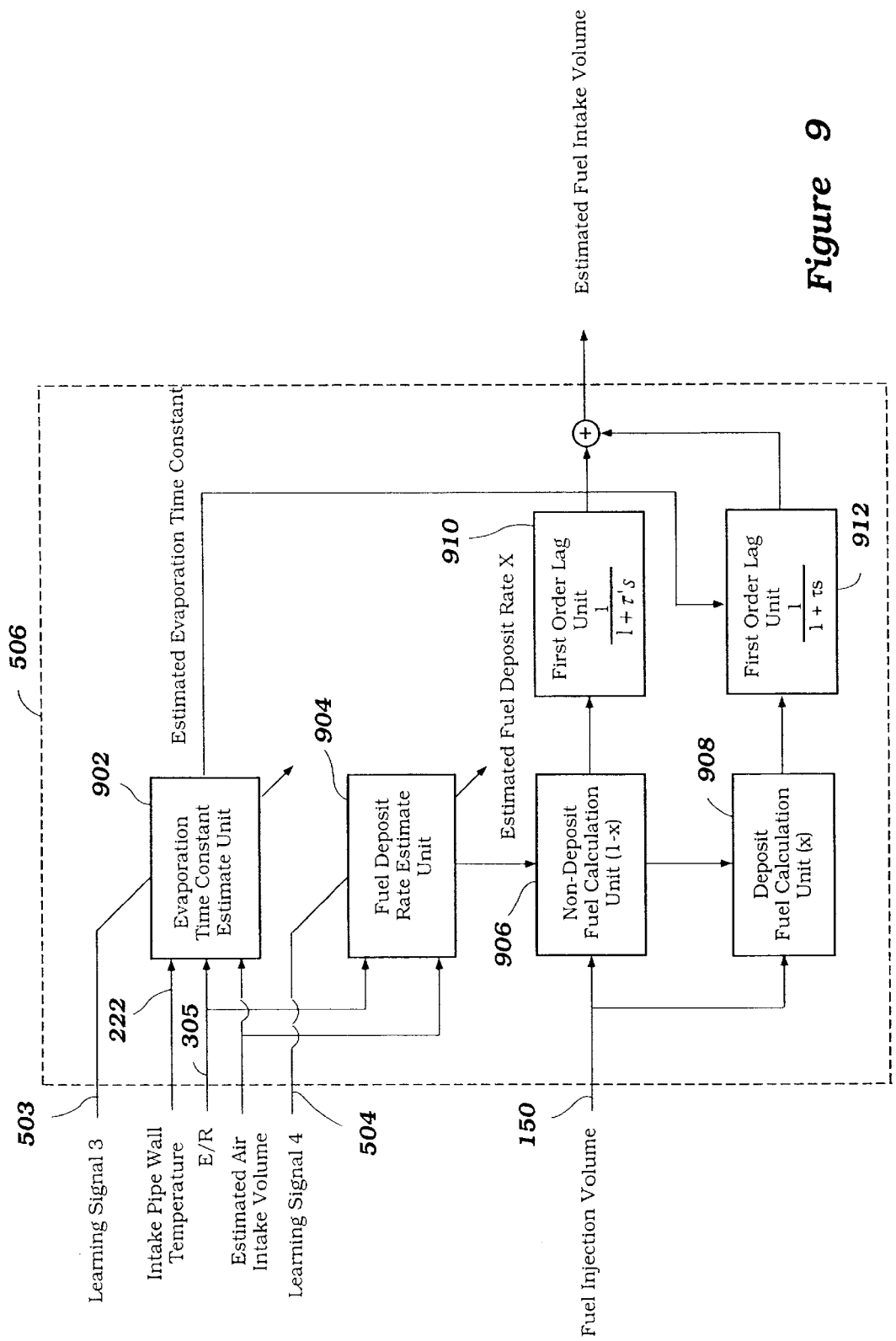
FIG. 9 is a block diagram showing a module for calculating an estimated fuel intake volume, for use in the model-based control system shown in FIG. 5.

FIG. 9 is a block diagram of the fuel volume estimator (i.e. fuel deposition forward model) module 506 shown in FIG. 5. The fuel deposition forward model 506 models the behavior of fuel injected from the fuel injector 107.

The fuel deposition forward model 506 includes a non-deposition fuel estimator 906, a fuel deposition estimator 908, first-order lag units 910 and 912, a fuel deposition rate estimator 904, and a time constant-of-evaporation estimator 902. The fuel deposition forward model 506 estimates a quantity Fv of fuel actually introduced into the cylinder based on the fuel injector signal 150.

The fuel deposition rate estimator 904 receives the engine speed signal E/R 305 and the estimated air intake volume, and based on this information, estimates a ratio r (hereinafter referred to as "fuel deposition ratio") of the fuel deposited on a wall of the intake manifold 103 to the fuel injected by the fuel injector 107.

The time constant-of-evaporation estimator 902 includes a FNN that receives the engine speed signal E/R 305, the estimated air intake volume, and the intake manifold wall temperature $T_e$ 222 (the temperature of the engine water), and which outputs a time constant $\tau$ for evaporation of the fuel deposited on the wall (hereinafter, referred to as "time constant of evaporation $\tau$").

The non-deposition fuel estimator 906 estimates the fuel quantity entering directly the cylinder from the fuel injector 107 based on the fuel injection signal 150.

The fuel deposition estimator 908 estimates the fuel quantity entering the cylinder after once being deposited on a wall based on the fuel injector signal 150 and based on the fuel deposition rate r outputted from the fuel deposition ratio estimator 904.

The fuel quantity obtained by the non-deposition fuel estimator 906 and the fuel deposition estimator 908 are approximated to a first-order lag system based on the time constants of evaporation $\tau 1$ and $\tau 2$ obtained from the time constant-of-evaporation estimator 902, and then summed to output it as the estimated fuel quantity Fv from the fuel deposition forward model 506.

The fuel deposition forward model 506 is a first-order lag system, and thus, when performing feedback control using the output of the fuel deposition forward model 506, a relatively large feedback gain can be used, thereby providing a more accurate inverse model for appropriate basic operation, even during a transient state.

The learning signal 504 is provided to train the FNN in the fuel deposition ratio estimator 904. The learning signal 503 is provided to train the FNN in the time constant-of-evaporation estimator 902.

As explained above, in the controller 206, the air intake estimator 504, the fuel deposition ratio estimator 904, and the time constant-of-evaporation estimator 902 in the airflow forward model 506 use fuzzy neural networks. It is possible to cause the models to approximate the actual engine conditions due to the learning function provided by the fuzzy neural networks in the models, thereby controlling the A/F ratio in the optimum range in accordance with changes in the surrounding environments or changes in the engine over time.

The FNN in each model has the structure of an autonomic system to obtain the fuzzy rules and the membership functions. Thus, initial learning becomes relatively simple. Even when errors between the models and the actual engine caused by the environmental changes and changes in the engine over time cannot be satisfactorily fixed solely by the learning function, the models can be adjusted by changing the structures of the models, by themselves in an autonomic way, to match the models with the actual engine. Thus, it is possible to control the A/F ratio of the engine 101 in accordance with changes in the surrounding environments and changes in the engine over time even when the changes are intense or drastic, e.g., when impurities enter into the engine.

Further, the controller 506 has structures wherein the phases of the airflow forward model (estimator) 504 and the fuel deposition forward model (estimator) 506, which estimate the air volume Av and the fuel quantity Fv, are advanced to a degree equivalent to the dead time at the model-based controller 206, and wherein the estimated control value Ev 150, obtained based on the estimated air volume Av and the estimated fuel quantity Fv obtained from the airflow forward model 504 and the fuel deposition forward model 506, is subjected to feedback to obtain the injector control signal Mf 150, thereby constituting an inverse model. Using the inverse model, the fuel deposition forward model 506 included in the feedback group of the inverse model can simply be a first-order lag system, and thus, a large feedback gain can be used in the inverse model. Accordingly, as compared with map control, for example, the control system using the inverse model improves controllability of the A/F ratio during a transient state of the engine, and prevents the air-fuel ratio from suddenly changing from the target value to a rich ratio or a lean ratio.

Figure 10:
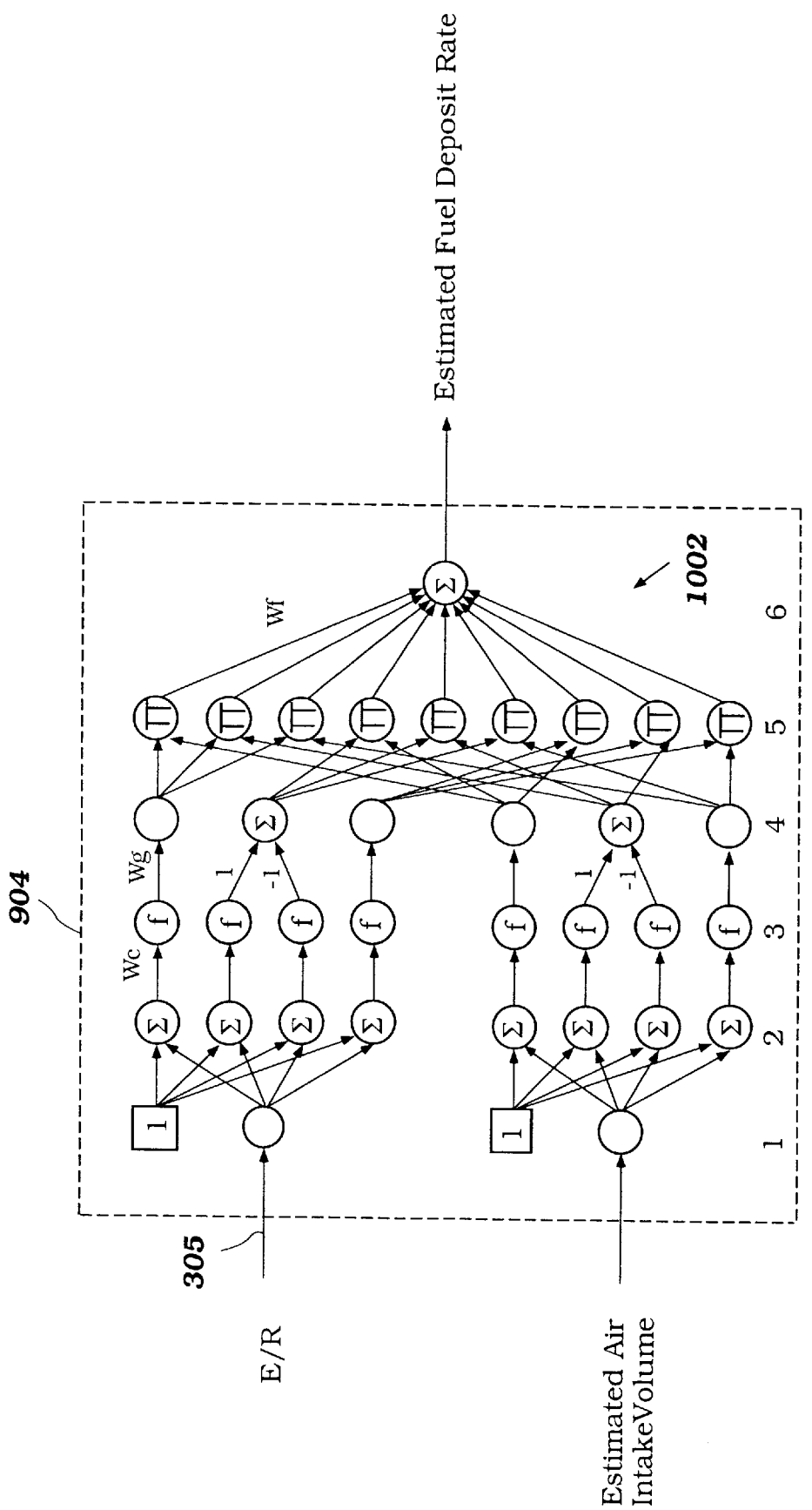
FIG. 10 is a block diagram showing a module for calculating a estimated fuel deposition rate (i.e., the amount of fuel adhering to an inner wall of the intake manifold or the like), for us in the model-based control system shown in FIG. 5.

FIG. 10 is a block diagram showing a FNN 1002 in the fuel deposition estimator 904 for calculating an estimated fuel deposition rate (i.e., the amount of fuel adhering to an inner wall of the intake manifold or the like). The FNN 1002 has two inputs: the engine speed E/R 305; and the estimated air intake volume. The FNN 1002 is a six-layer network and functions in a manner similar to the FNN 609 described in connection with FIG. 6 above, except that in the FNN 1002, there are only 9 rules (3×3=9) in the fifth layer.

Figure 11:
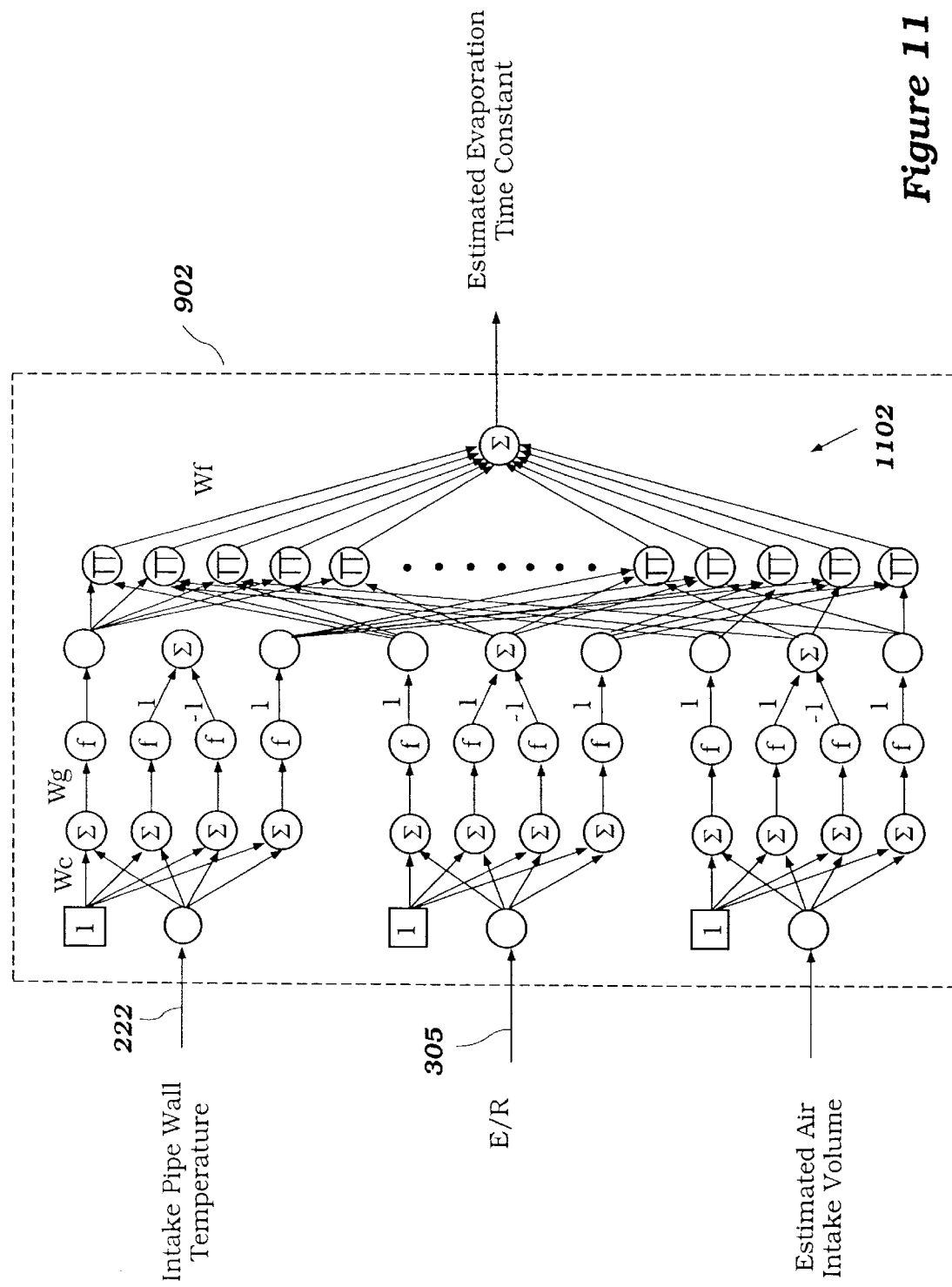
FIG. 11 is a block diagram showing a module for calculating a estimated evaporation time constant for use in the model base control system shown in FIG. 5.

FIG. 11 is a block diagram of the evaporation-time-constant estimator 902, for calculating the estimated evaporation time constant. The estimator 902 is based on a FNN 1102 having up to three inputs: the intake manifold wall temperature 222; the engine speed E/R 305; and the estimated air intake volume. The FNN 1102 is a three-input, six-layer FNN similar to the FNN 609 described in connection with FIG. 6 above.

Figure 12:
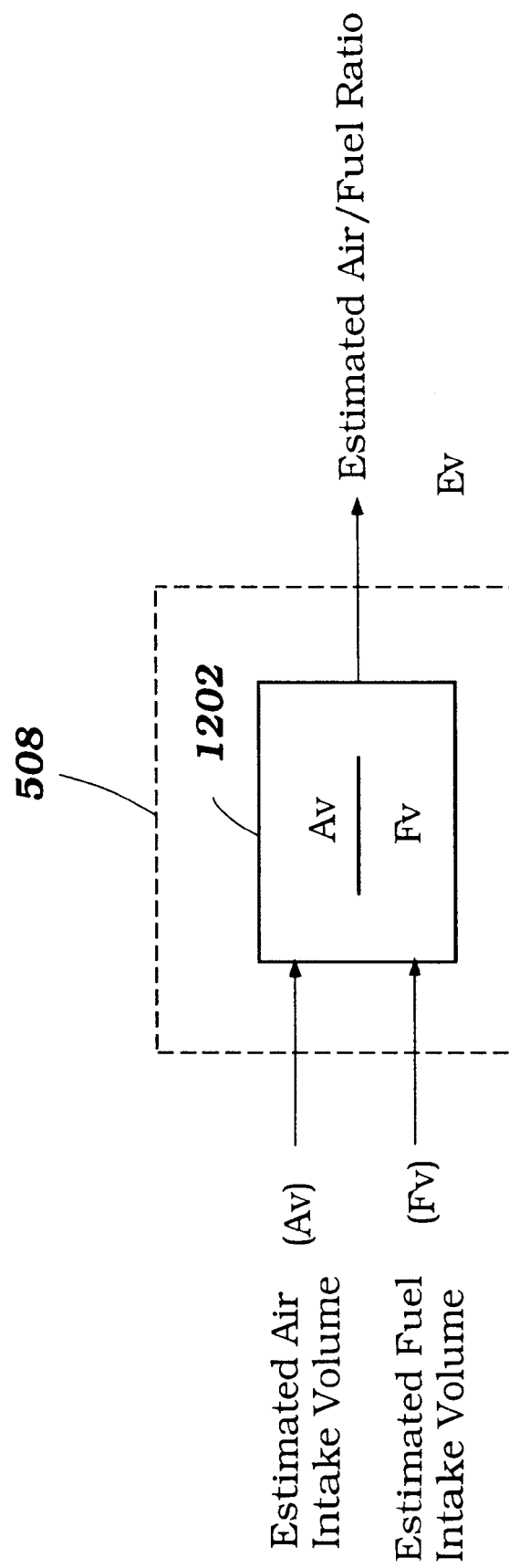
FIG. 12 is a block diagram showing a module for calculating a estimated air/fuel ratio based upon the estimated air intake volume and the estimated fuel intake volume for use in the model-based control system shown in FIG. 5.

FIG. 12 is a block diagram of the A/F estimator 508 for calculating an estimated air/fuel ratio $E_v$, based upon the estimated air amount $A_v$, and the estimated fuel intake volume $F_v$, where $E_v=A_v/F_v$.

Figure 13:
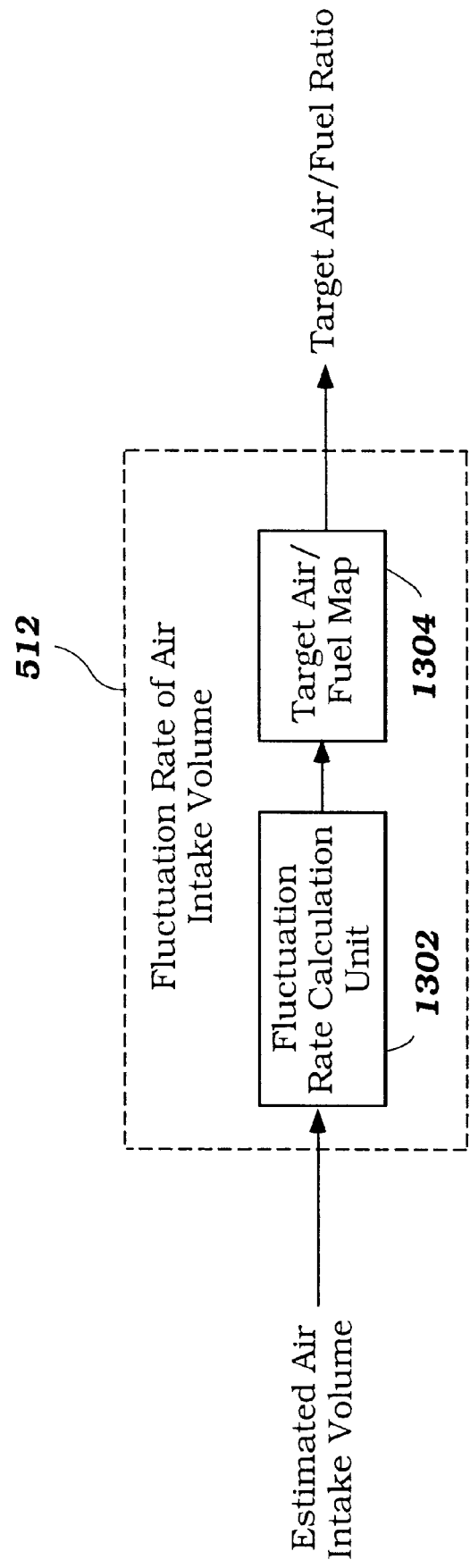
FIG. 13 is a block diagram showing a module for calculating a target air/fuel ratio for use in the model-based control system shown in FIG. 5.

FIG. 13 is a block diagram showing the target A/F ratio calculator 512 for calculating the target air/fuel ratio. In the calculator 512, the estimated air intake volume is provided to an input of a fluctuation rate calculator 1302. An output of the fluctuation rate calculator 1302 is provided to a target A/F map 1304. An output of the target A/F map is the target A/F ratio.

Figure 14:
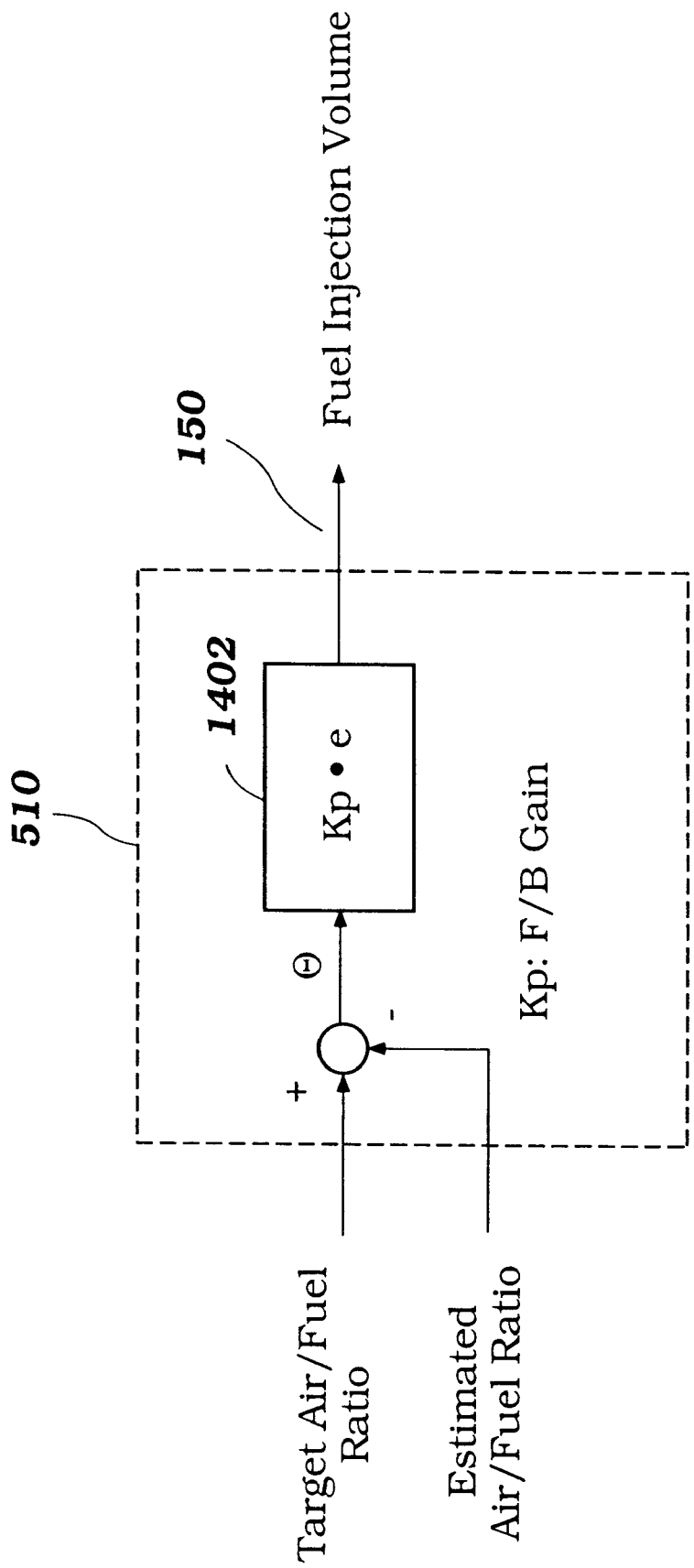
FIG. 14 is a block diagram showing a module for operating an internal feedback loop to bring the estimated air/fuel ratio close to the target A/F ratio in the model-based control system shown in FIG. 5.

FIG. 14 is a block diagram of the feedback calculator 510 for operating an internal feedback system to bring the estimated air/fuel ratio close to the target air/fuel ratio during online operation of the model-based control system 206. The calculator 510 computes the difference between the estimated A/F ratio provided by the A/F ratio estimator 508 and target A/F ratio provided by the target A/F calculator 512. The difference is multiplied by a feedback gain Kp to produce the injector signal 150 (Mf). The feedback calculator 510 is used during on-line learning while the controller 206 actually controls the engine 101.

Figure 15:
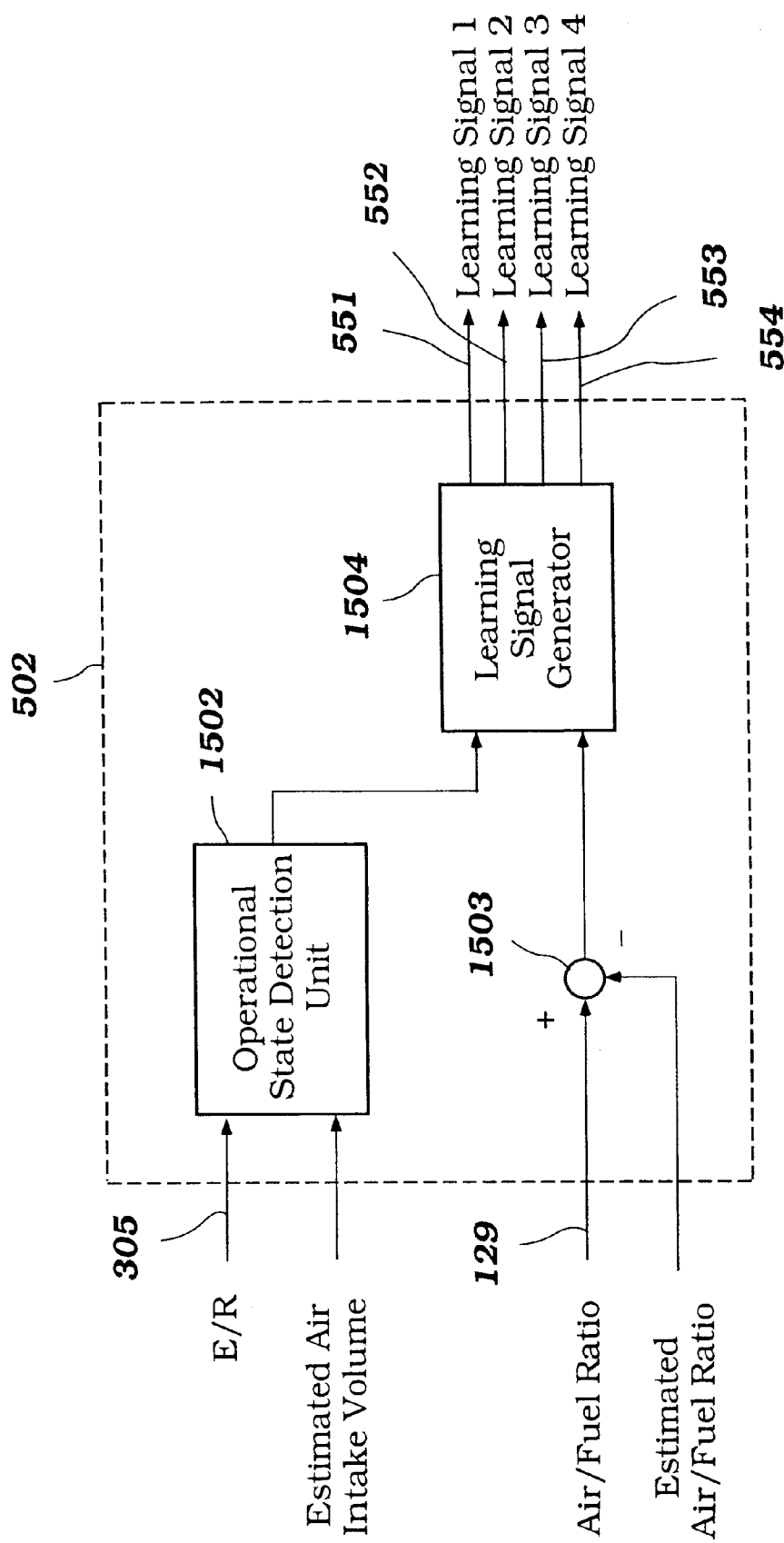
FIG. 15 is a block diagram showing a module for generating learning signals, in the model-based control system shown in FIG. 5.

FIG. 15 is a block diagram of the learning signal calculator 502 for generating the teaching signals 551–554. In the calculator 502, the engine speed E/R 305 and the estimated air intake volume are provided to respective inputs of an operational state detector 1502. An output of the operational state detector 1502 is provided to a first input of a learning signal generator 1504. Also in the calculator 502, the A/F ratio 129 is subtracted from the estimated A/F ratio, and the difference is provided to a second input of the learning signal generator 1504. The learning signal generator provides four learning signals 551–554 as outputs. Learning can be initiated automatically or upon user request.

As shown in FIG. 15, the learning signal calculating section includes an operation state detector 1502 and a learning signal generator 1504. The operation state detector receives the input data of engine speed and estimated intake air rate and, based on these data, determines the current engine operating state, for example, a transient state or a steady state.

The learning signal generator 1504 receives the input data for the error of the estimated air-fuel ratio relative to the measured exhaust air-fuel ratio, and determines the teaching (learning) signals 551 through 554 so that the error is reduced.

The learning signals 551 and 552 are for the intake air rate calculator, and they are calculated from the information obtained when the engine operation is in steady state (stationary). Since the learning signals 553 and 554 are for the intake fuel rate calculator, they are calculated from the information obtained when the engine is operating in a transient state.

Furthermore, since the learning signal 551 is for the correction factor for correcting the output of the FNN according to changes in the environment (e.g., driving up a slope or down a slope), it is issued in succession according to changes in the environment during the steady state with a large gain. Since the learning signal 552 is for the consequent portion coupling factor wf of the FNN, whether it should be issued or not is determined according to the tendency of the output value of the learning signal 551 so as to avoid response to the error due to changes in the environment. The learning signal 551 is continuously on the increase during the upward slope running and it is decreasing during the downward slope running. In such cases, the environment is deemed to be changing, and the learning with the learning signal 552 is not carried out.

When there is no change in the environment, learning is carried out with both the learning signals 551 and 552. However, it is arranged that the gain is larger for the learning using the learning signal 551 than for the learning of the FNN using the learning signal 552.

When the output of the learning signal 552 is determined according to the tendency of the output of the learning signal 551 as described above, the consequent portion coupling factor the FNN does not change in response to the environmental changes. As a result, unnecessary learning is not carried out and therefore, the output of the FNN becomes stabilized.

The controller described above uses the input information and the antecedent portion coupling factors of the FNNs of respective estimating sections of the model-based controller to optimize, in advance, using the genetic algorithm while taking into consideration the relationship with the consequent portion coupling weight $w_f$ and that only the learning of the consequent portion coupling weight $w_f$ is carried out during the execution of the control. However, the optimization of the FNN is not limited to the first embodiment, by may be carried out during execution of the control as shown below.

Figure 16:
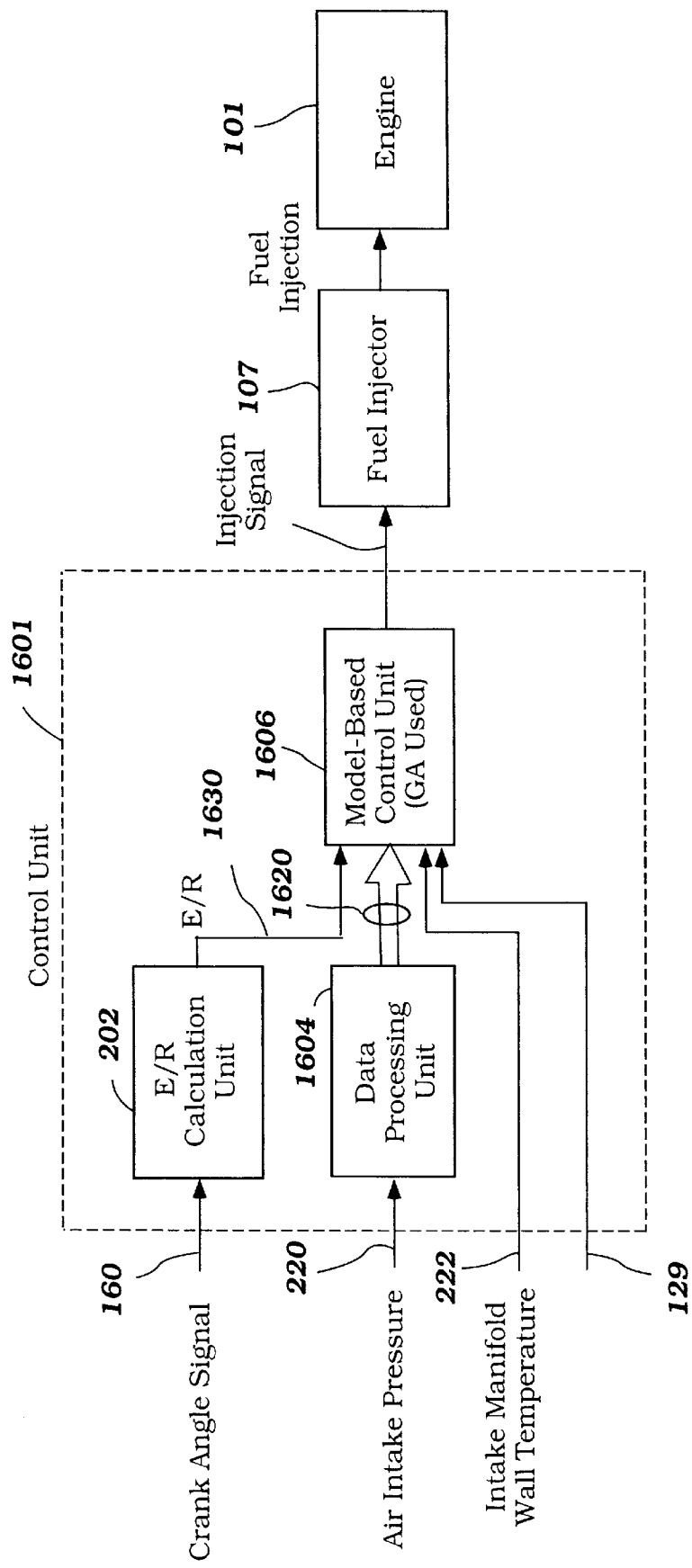
FIG. 16 is a block diagram showing a second engine control system.

FIG. 16 is a block diagram showing an engine system 1601 as a second embodiment of the control system 102. The control system 201 comprises an engine speed calculation module 202, a pressure data module 1604 for transforming air intake pressure data, and a model-base control module 1606. The engine speed calculation module 202 calculates engine speeds based upon the crank angle signal 160 by comparing the crank angle signal with time. The pressure data module 1604 transforms the intake pressure signal 220 (provided by the air intake manifold negative pressure sensor 124) into pressure signals 1620. The model-based control module 1606 accepts the engine speed signal 224, the pressure signals 1620, the intake manifold (inner) wall temperature signal 222, and the A/F ratio signal 129. An output of the model-based control module 1606 is the injector control signal (Mf) 150.

Figure 17:
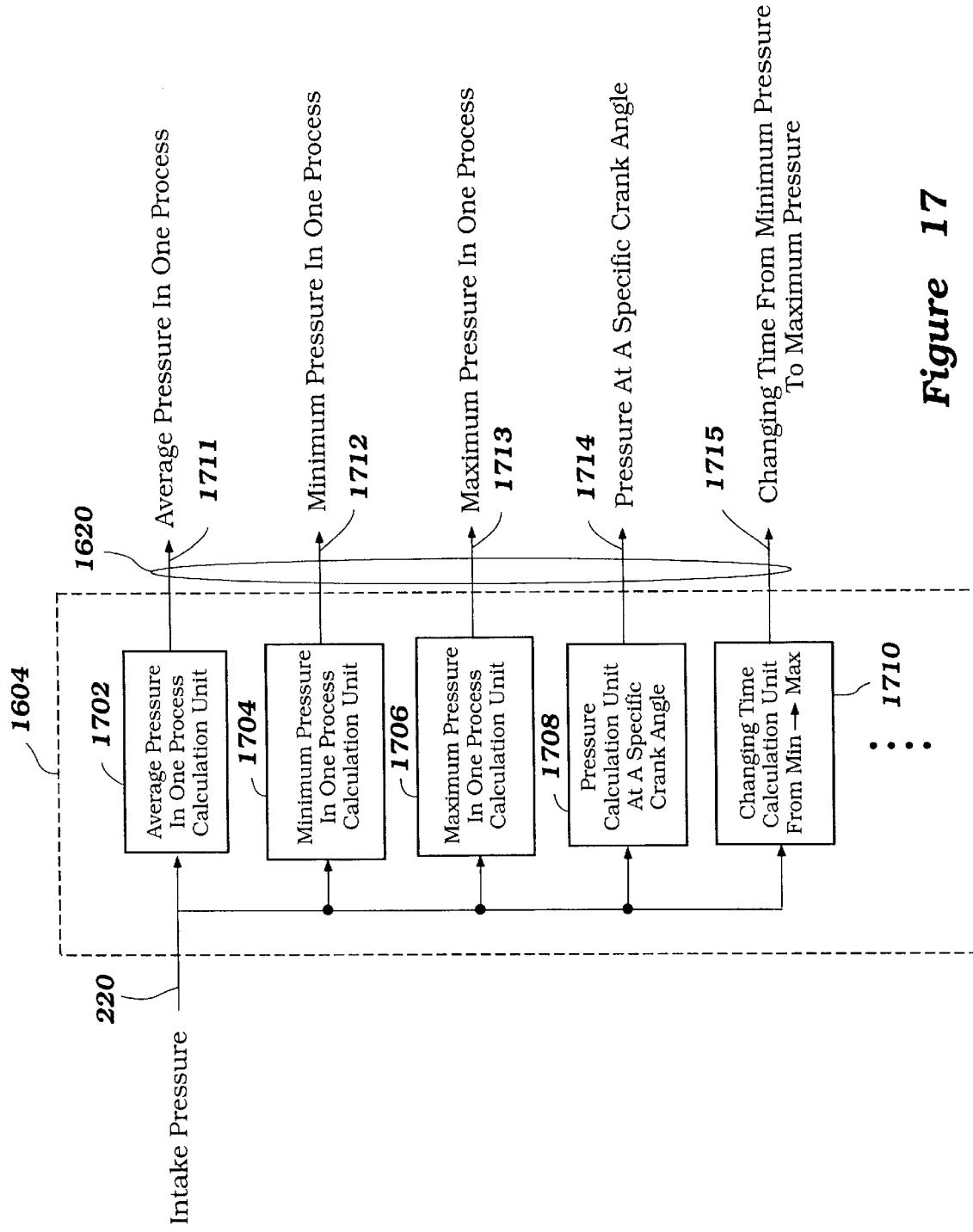
FIG. 17 is a block diagram showing a module for transforming intake pressure data into average pressure, minimum pressure, maximum pressure, and pressure at a specific crank and for use by the control system shown in FIG. 16.

FIG. 17 is a block diagram of the pressure data module 1604 shown in FIG. 16. The pressure data module 1604 includes an averaging module 1702 for calculating an average pressure 1711 per stroke, a minimum pressure module 1704 for detecting the minimum pressure 1712 per stroke, a maximum pressure module 1706 for detecting the maximum pressure 1713 per stroke, a crank-pressure pressure module 1708 for detecting a pressure at a specific crank angle signal 1714, and a changing-time calculator 1710 for detecting the elapsed time 1715 between minimum and maximum pressure per stroke. The intake air pressure signal 220 is provided to an input of each of the modules 1702, 1704, 1706, 1708, 1710.

Figure 18:
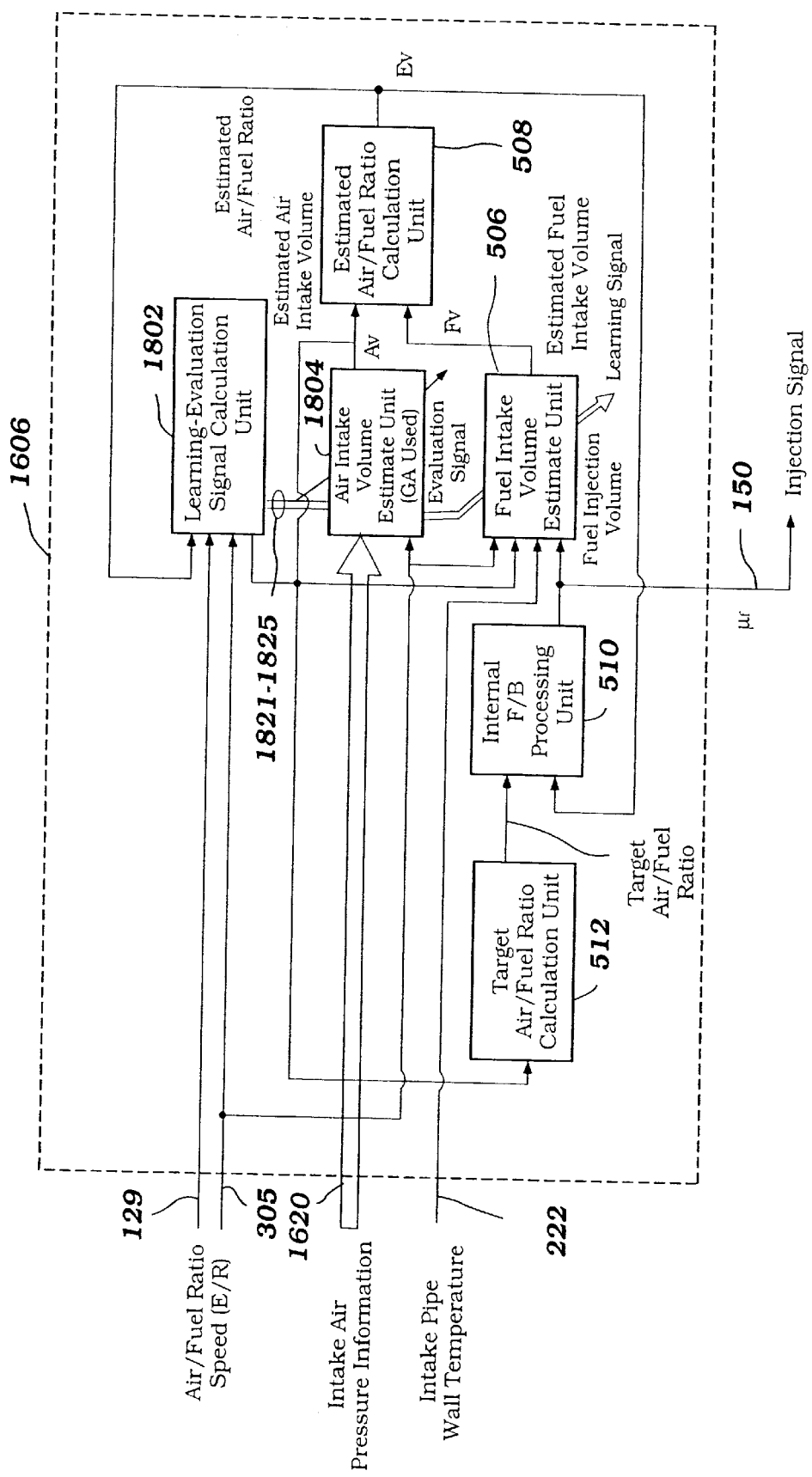
FIG. 18 is a block diagram showing a model-based control system used in the engine control system shown in FIG. 16.

FIG. 18 is a block diagram showing a model-based control system 1606 used in the engine control system 1601 shown in FIG. 16. The model-based control system 1606 includes a learning module 1802, an air intake volume estimator module 1804, the fuel volume estimator module 506, the A/F estimator module 508, the feedback module 510 and the target A/F ratio module 512.

The intake air estimator module 1804 is a forward model of the air charge system that is based on the behavior of the air charge in the air intake manifold 103. The intake air estimator 1804 accepts the pressure signals 1620 and the E/R signal 305, and provides an estimated air intake volume. The fuel volume estimator 506 is a forward model of the fuel system that is based on behavior of the fuel injected into the air intake manifold 103 by the fuel injector 107. The fuel volume estimator 506 accepts the E/R signal 305, the estimated intake air signal 504, the intake manifold wall temperature signal 222, and the injector control signal 150 and provides a estimated A/F ratio signal.

The A/F estimator 508 accepts the estimated intake air volume signal and the estimated fuel intake volume signal and provides the estimated A/F ratio signal. The target A/F module 512 accepts the estimated intake air volume signal and provides a target A/F ratio signal. The feedback module 510 accepts the target A/F ratio signal and the estimated A/F ratio and provides the injector signal Mf 150.

The learning module 1802 accepts the A/F ratio signal 129 provided by the air fuel ratio sensor 123, the E/R signal 305, the estimated intake air volume signal, and the estimated A/F ratio signal; and provides learning data signals 1821–1825 to a learning input of the air intake volume estimator 504 and the fuel intake volume estimator 506. The learning module 1802 also provides an evaluation signal to the air intake volume estimator 1804.

Figure 19:
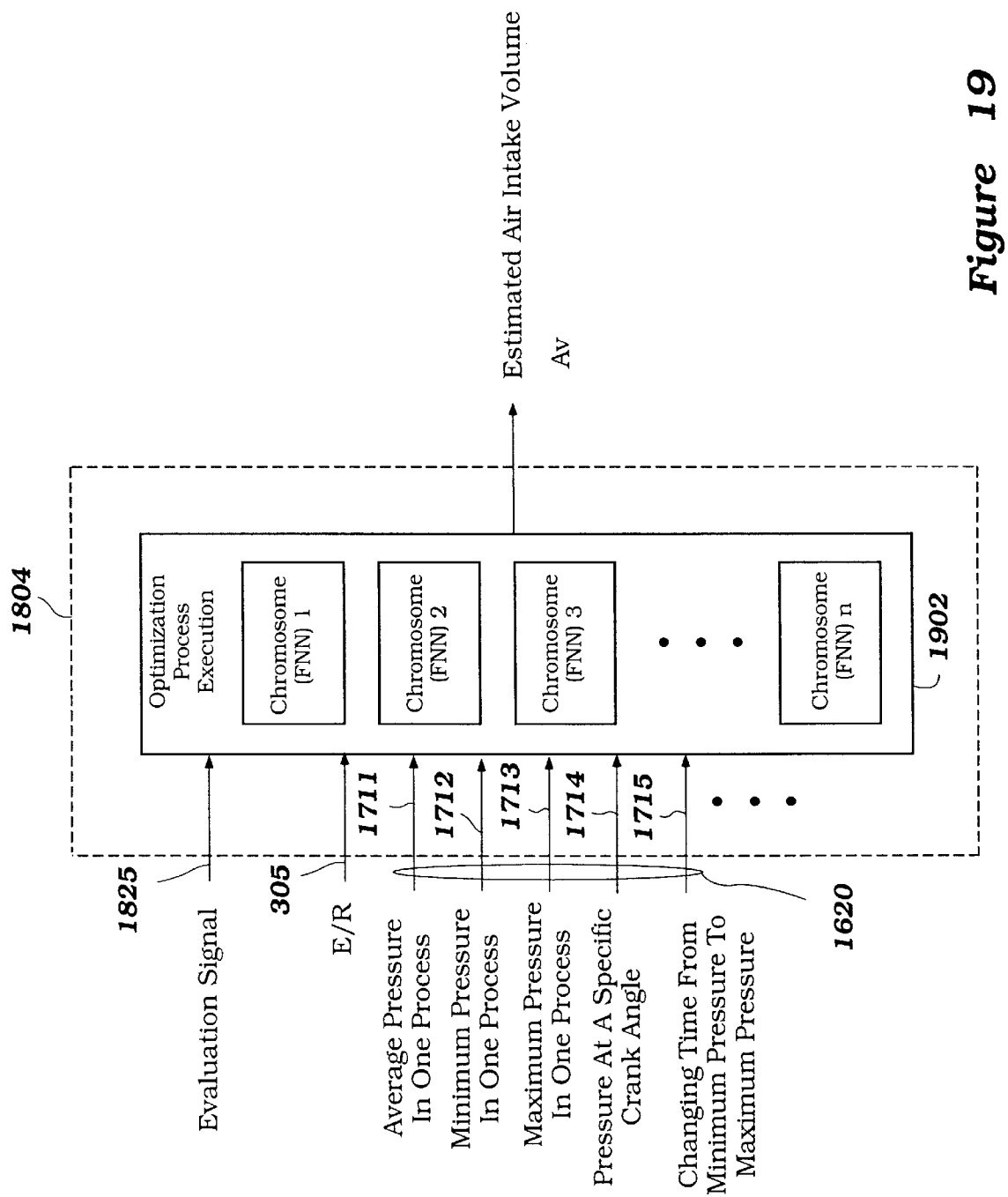
FIG. 19 is a block diagram showing a module for calculating an estimated intake air volume in the model-based control system shown in FIG. 18.

FIG. 19 is a block diagram of the air intake volume estimator 1804. In the estimator 1804, the evaluation signal 1825, the engine speed E/R 305, and the pressure signals 1620 are provided to an optimization unit 1902. The evaluation signal 1825 directs the optimization unit 1902 to calculate the estimated air intake volume (Av) using fuzzy neural networks 1-n, where each FNN is associated with an individual (i.e. a chromosome) generated by a genetic optimizer. The fuzzy neural networks compute the estimated air intake volume using the engine speed E/R 305 and the pressure signals 1620 as inputs. The output of the optimization unit 1902 is the estimated air intake volume. The optimization unit 1902 operates as described in connection with FIG. 7 and it generates chromosomes as described in connection with FIG. 8.

Figure 20:
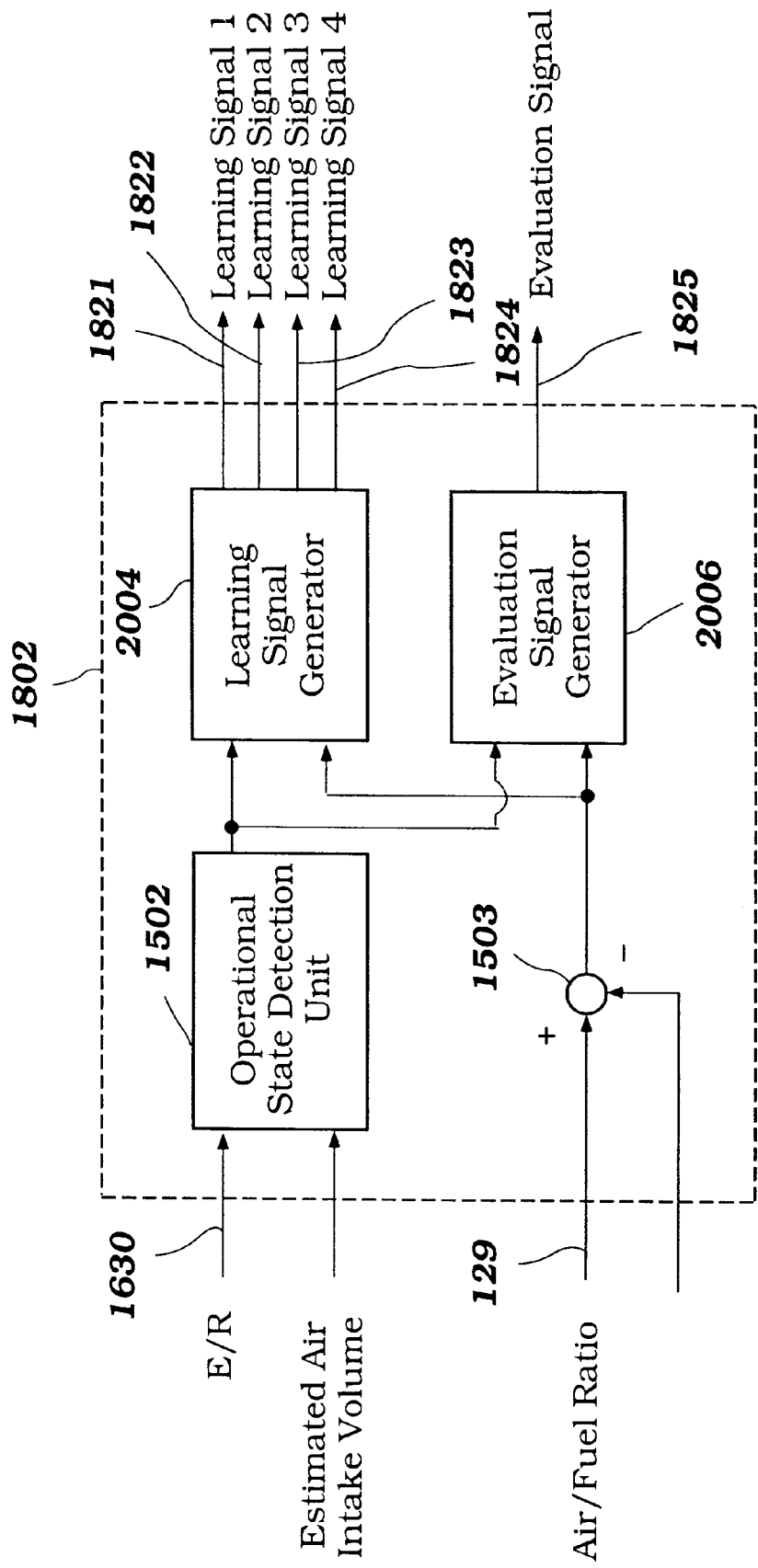
FIG. 20 is a block diagram showing a module for generating learning signals and evaluation signals for use in the model-based control system shown in FIG. 18.

FIG. 20 is a block diagram showing a module for generating learning signals and evaluation signals for use in the model-based control system shown in FIG. 18. FIG. 20 is a block diagram of the learning signal calculator 1802 for generating the teaching signals 1821–1824 and the evaluation signal 1825. In the calculator 1802, the engine speed E/R 305 and the estimated air intake volume are provided to respective inputs of an operational state detector 1502. An output of the operational state detector 1502 is provided to a first input of a leaning signal generator 2004 and to a first input of an evaluation signal generator. Also, in the calculator 502, the A/F ratio 129 is subtracted from the estimated A/F ratio and the difference is provided to a second input of the learning signal generator 1504 and to a second input of the evaluation signal generator 2006. The learning signal generator provides the four learning (teaching) signals 1821–1824 as outputs. The evaluation signal generator provides the evaluation signal 1825 as an output.

The learning and evaluation signal calculating sections (like that of the first embodiment described in connection with FIG. 16 when the optimization process is not carried out in the intake air rate estimating section) calculates and outputs the leading signals 1821, and 1822 for the intake air rate estimator and the learning signals 553 and 554 for the intake fuel rate estimators according to the operating state of the engine.

When the optimization process is being carried out in the intake air rate estimating section, evaluation signals of respective individuals, in addition to the above-described learning signals 1821–1824, are outputted from the evaluation signal generation section according to the error between the estimated and measured values of the air-fuel ratio.

In the intake air rate estimating section, during the optimization process, learning of the consequent portion coupling $w_f$ is carried out when the FNN is being operated using respective individuals according to the learning signal 1822 outputted from the learning and evaluation signal calculator, and determines the evaluations of respective individuals according to the evaluation signals.

In the first and second embodiments described so far, ending of the optimization process is determined according to whether the output error of the FNN is smaller than the tolerance value. However, the condition of the ending determination is not limited that that in the above embodiments. It may also be arranged such that the process is repeated for a predetermined number of generations, or that the evolution is finished when the decreasing tendency of the output error is deemed to be converging.

In the embodiments described above, both of the input information and the membership functions of the FNN are optimized using the genetic algorithm. However, the invention is not limited to the above embodiments and may also be embodied otherwise. The member ship function may be optimized by adding fuzzy rules using the changing tendency of the coupling factor and the decreasing tendency of the error of the FNN in the learning process as decision criteria. At the same time, using the linearity of the consequent portion coupling weights of at least three membership functions in the same input information as the decision criteria, when the coupling factors have linearity, at least one of the membership functions corresponding to the consequent portion weights is deleted.

FIG. 21 shows a chromosome structure for encoding coupling coefficients of the FNN, as genetic information.

FIGS. 22A–22C illustrate neural network topologies useful with the present disclosure. All of the topologies shown in FIGS. 22A–22C have n inputs and one output.

FIG. 22A shows a single FNN having n inputs and one output similar, for example, to the FNN shown in FIG. 6.

FIG. 22B shows a compound FNN having n fuzzy neural networks, shown as a first network 2210, a second network 2211, and an n'th network 2212. Inputs 1-n are provided to each of the n neural networks. Each of the n neural networks produces an output. The outputs are summed by an adder 2218 to produce a single output for the compound FNN.

FIG. 22C shows a second compound FNN having n fuzzy neural networks, shown as a first network 2310, a second network 2311, and an n'th network 2312. Inputs 1-n are provided to each of the n neural networks. Each of the n neural networks produces an output. The n outputs are provided as inputs to a FNN 2318. The FNN 2318 produces a single output.

While the fuzzy neural network of each estimating section includes the basic FNN shown in FIG. 22A, the compound FNN structures are not limited to such an embodiment, and can be configured as shown in FIGS. 22B and 22C. Even if the FNN is configured as shown in FIGS. 22B or 22C, the selection of input information and the determiination of respective coupling factors can be made according to the algorithm outlined above in connection with FIGS. 7 and 8.

Figure 23:
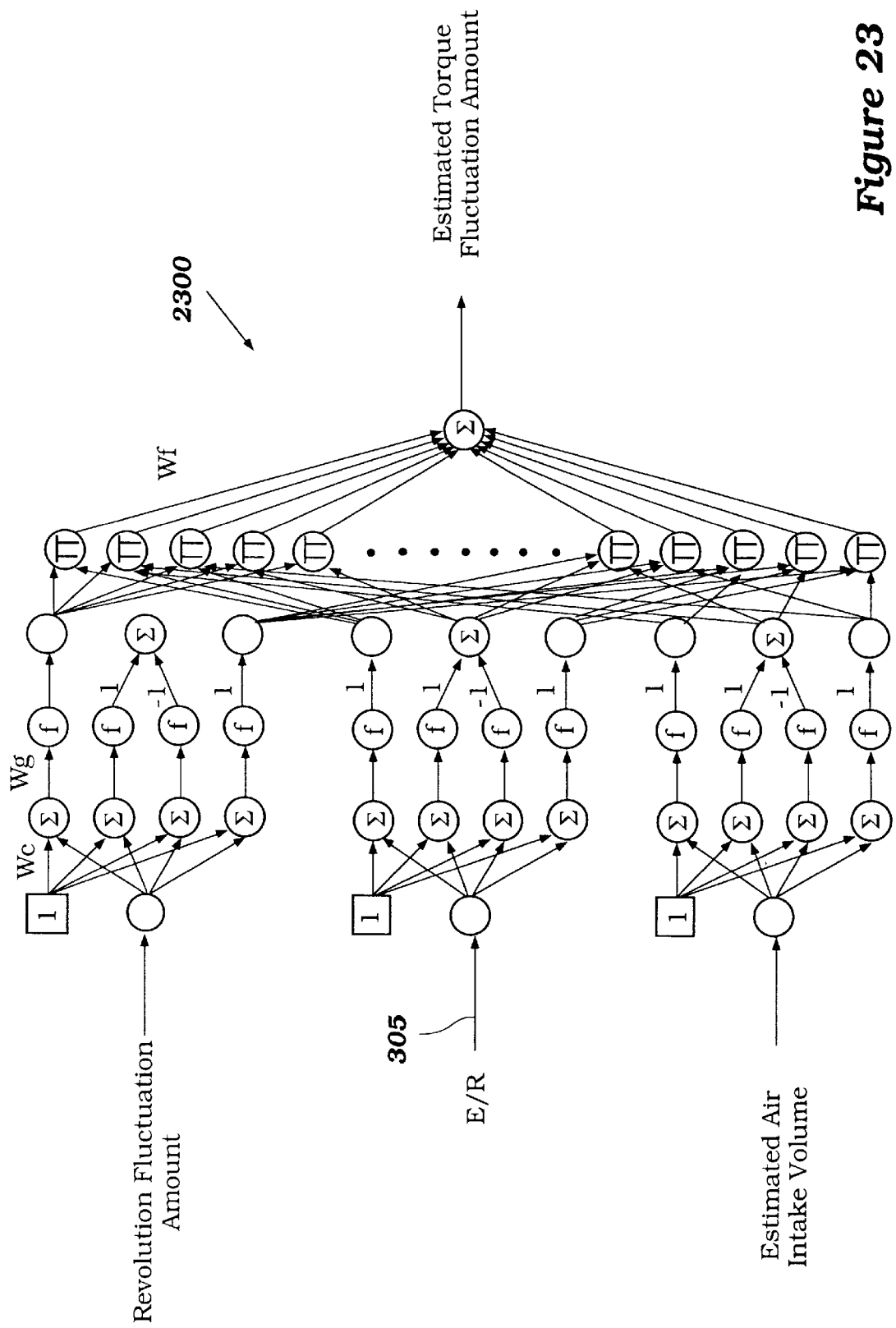
FIG. 23 shows an example of a neural network for estimating a torque fluctuation amount.

FIG. 23 shows a FNN 2300 for estimating a torque fluctuation amount. The FNN 2300 is similar in structure to the FNN 609 shown in FIG. 6, having six levels, three inputs, one output, and parameters $w_c$, $w_g$, and $w_f$. The inputs to the FNN 2300 are a revolution fluctuation value, the engine speed E/R 305 and the estimated air intake volume.

Figure 24:
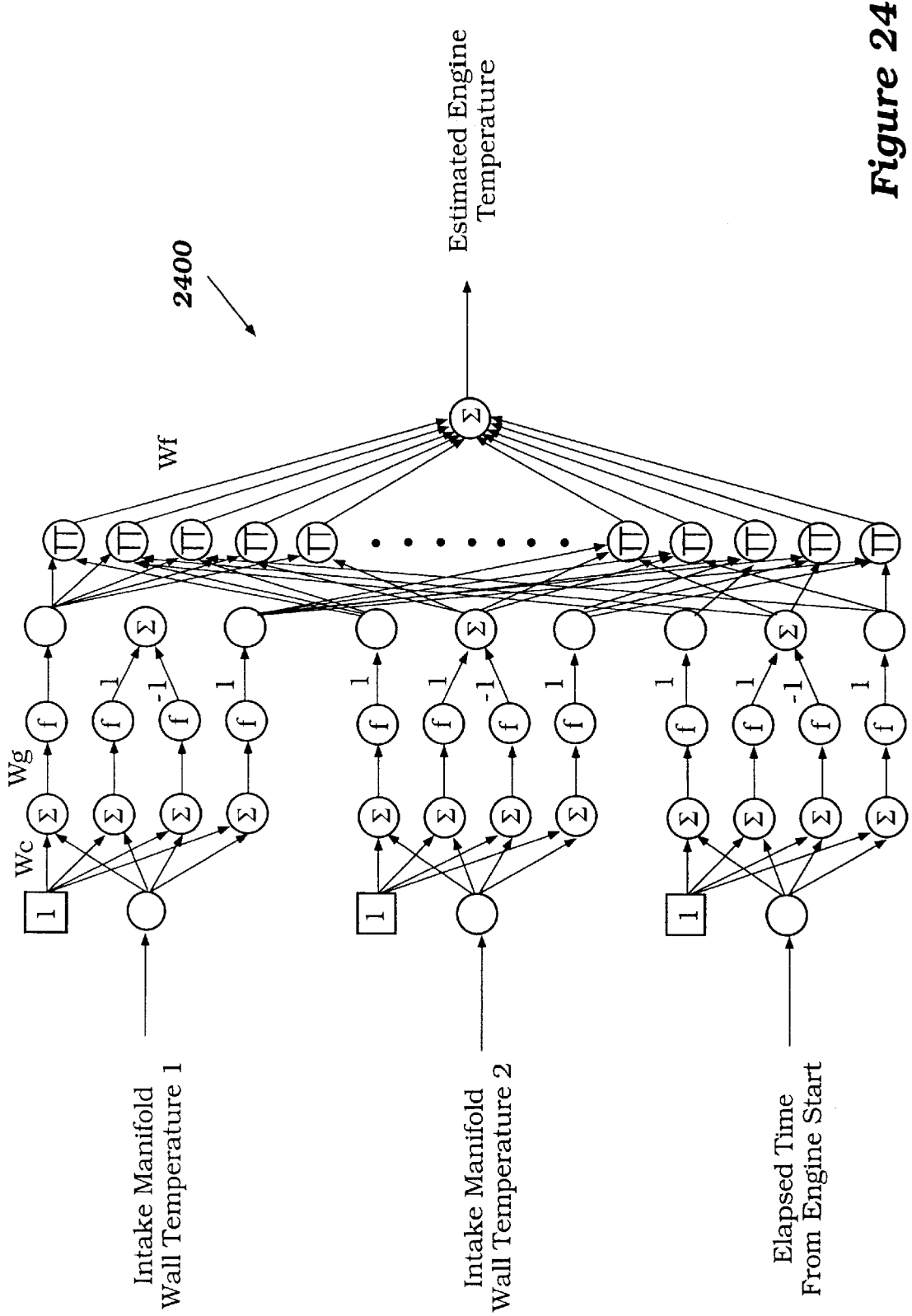
FIG. 24 shows an example of a neural network for estimating engine combustion chamber temperature.

As shown in FIG. 23 the amount of variation in torque may be estimated with a FNN using at least one of: the amount of variation in the engine speed; the engine speed; the time sequential data of the intake air rate, and/or the combustion chamber pressure FIG. 24 shows a FNN 2400 for estimating engine combustion chamber temperature. The FNN 2400 is similar in structure to the FNN 609 shown in FIG. 6, having six levels, three inputs, one output, and parameters $w_c$, $w_g$, and $w_f$. The inputs to the FNN 2400 are a first intake manifold wall temperature, a second intake manifold wall temperature and an elapsed time since engine startup.

Figure 25:
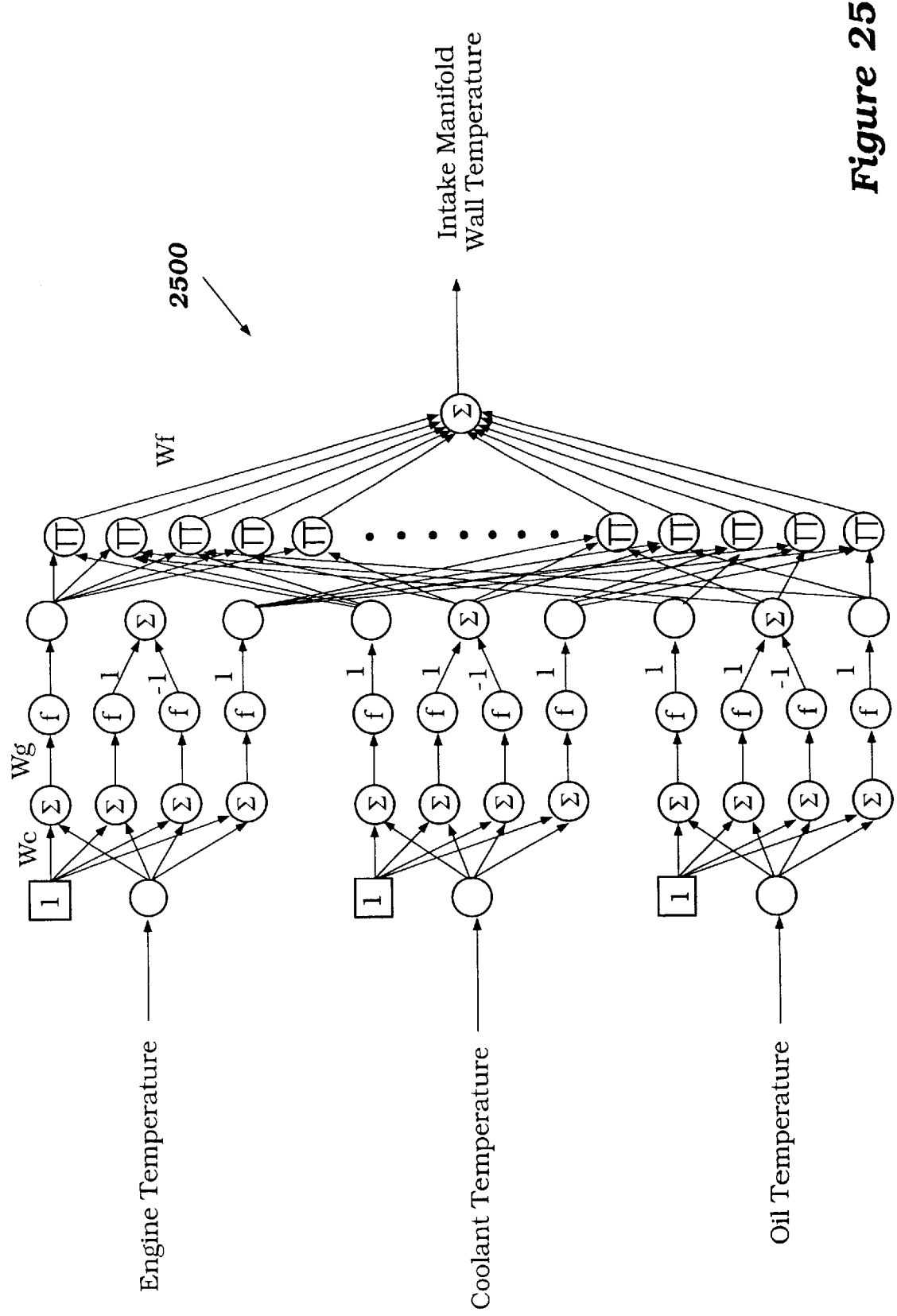
FIG. 25 shows an example of a neural network for estimating an intake manifold wall temperature.

A shown in FIG. 25, the combustion chamber temperature may be estimated using a FNN 2500. The FNN 2500 is similar in structure to the FNN 609 shown in FIG. 6, having six levels, three inputs, one output, and parameters $w_c$, $w_g$, and $w_f$. The inputs to the FNN 2500 are an engine temperature, an engine coolant temperature, and an oil temperature.

Figure 26:
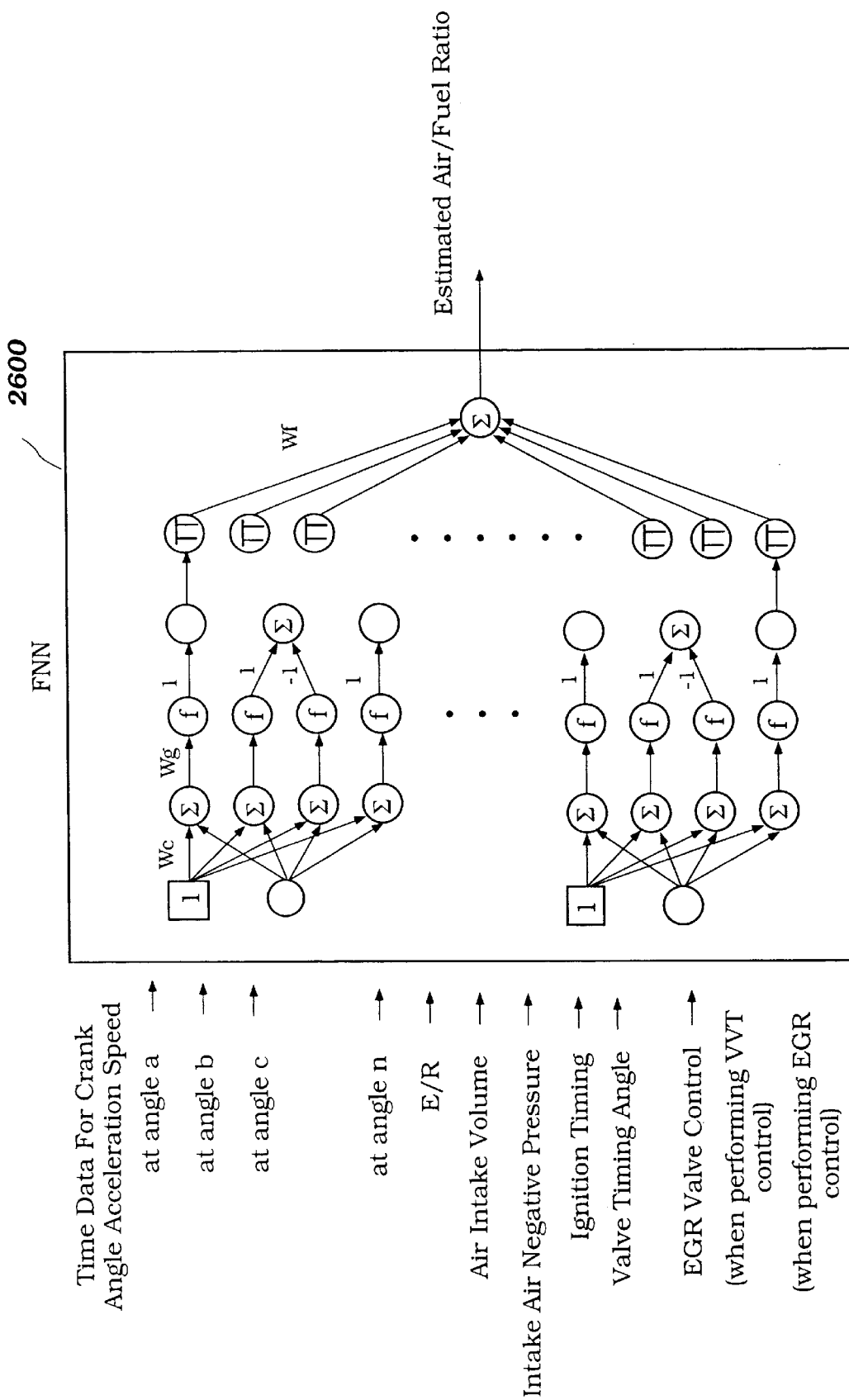
FIG. 26 shows an example of a neural network for estimating the air-fuel (A/F) ratio in the engine exhaust.

FIG. 26 shows a FNN 2600 for estimating the air-fuel (A/F) ratio in the engine exhaust. The FNN 2600 is similar in structure to the FNN 609 shown in FIG. 6, having six levels and parameters $w_c$, $w_g$, and $w_f$. The FNN 2600 estimates the A/F ratio of the engine exhaust from data such as the crank-angle acceleration, the crank angle, the engine speed, the air intake volume, the intake air vacuum pressure, the ignition timing, the valve timing angle, an Exhaust Gas Recirculator (EGR) valve control, etc. In one embodiment, crank-angle acceleration is estimated by using input data from three crank angle sensors (crank angle sensors a, b, and c), disposed about the rotational path of the crankshaft to sense crankshaft position at three different times during the rotation of the crankshaft.

Figure 27:
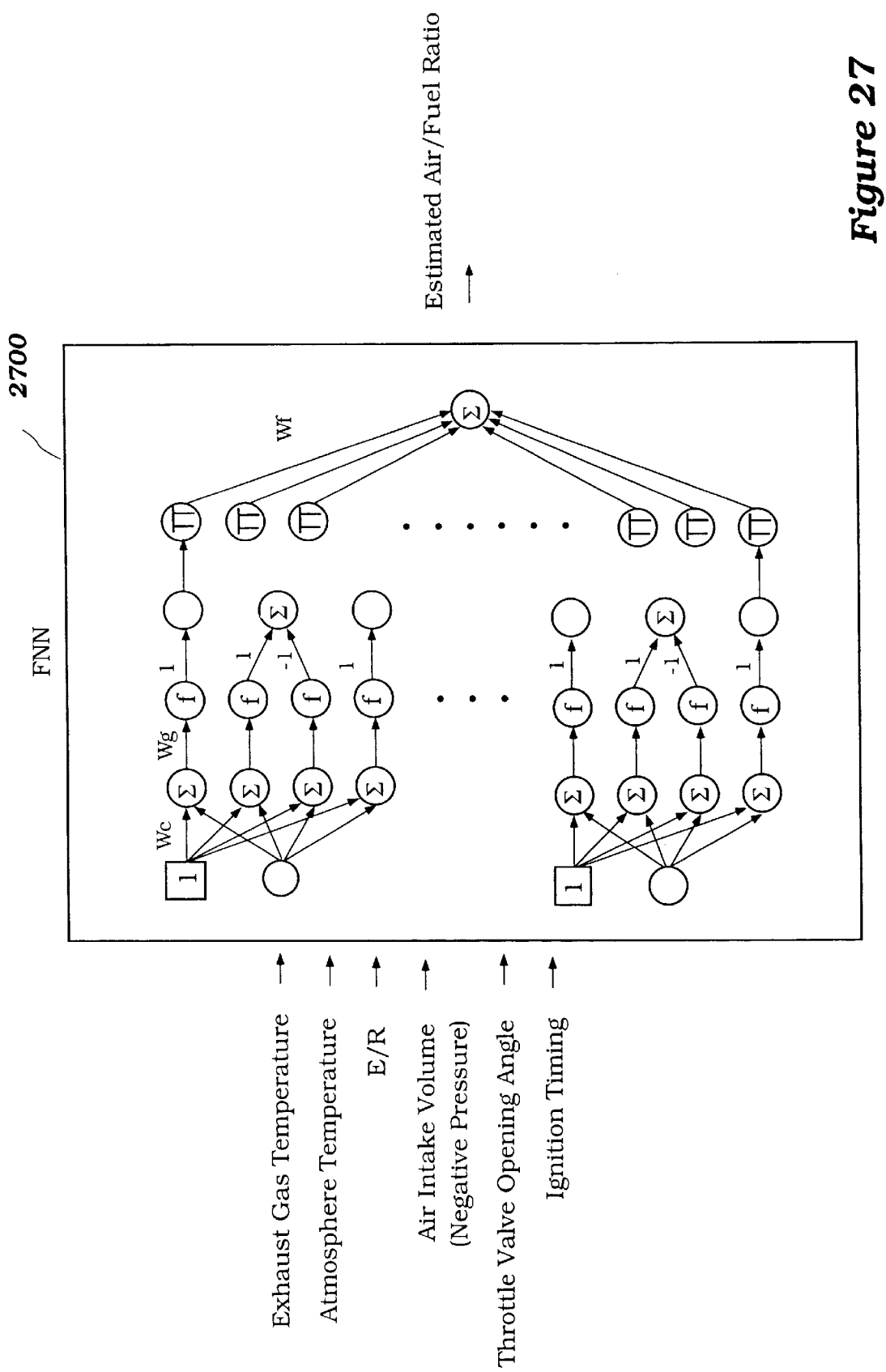
FIG. 27 shows a second example of a neural network for estimating the air-fuel (A/F) ratio the engine exhaust.

FIG. 27 shows a FNN 2700 for estimating the air-fuel (A/F) ratio in the engine exhaust. The FNN 2700 is similar in structure to the FNN 609 shown in FIG. 6, having six levels and parameters $w_c$, $w_g$, and $w_f$. The FNN 2700 estimates the A/F ratio of the engine exhaust from input data such as the exhaust gas temperature, the ambient air temperature, the engine speed, the air intake volume (intake vacuum), the throttle angle, and/or the ignition timing.

Figure 28:
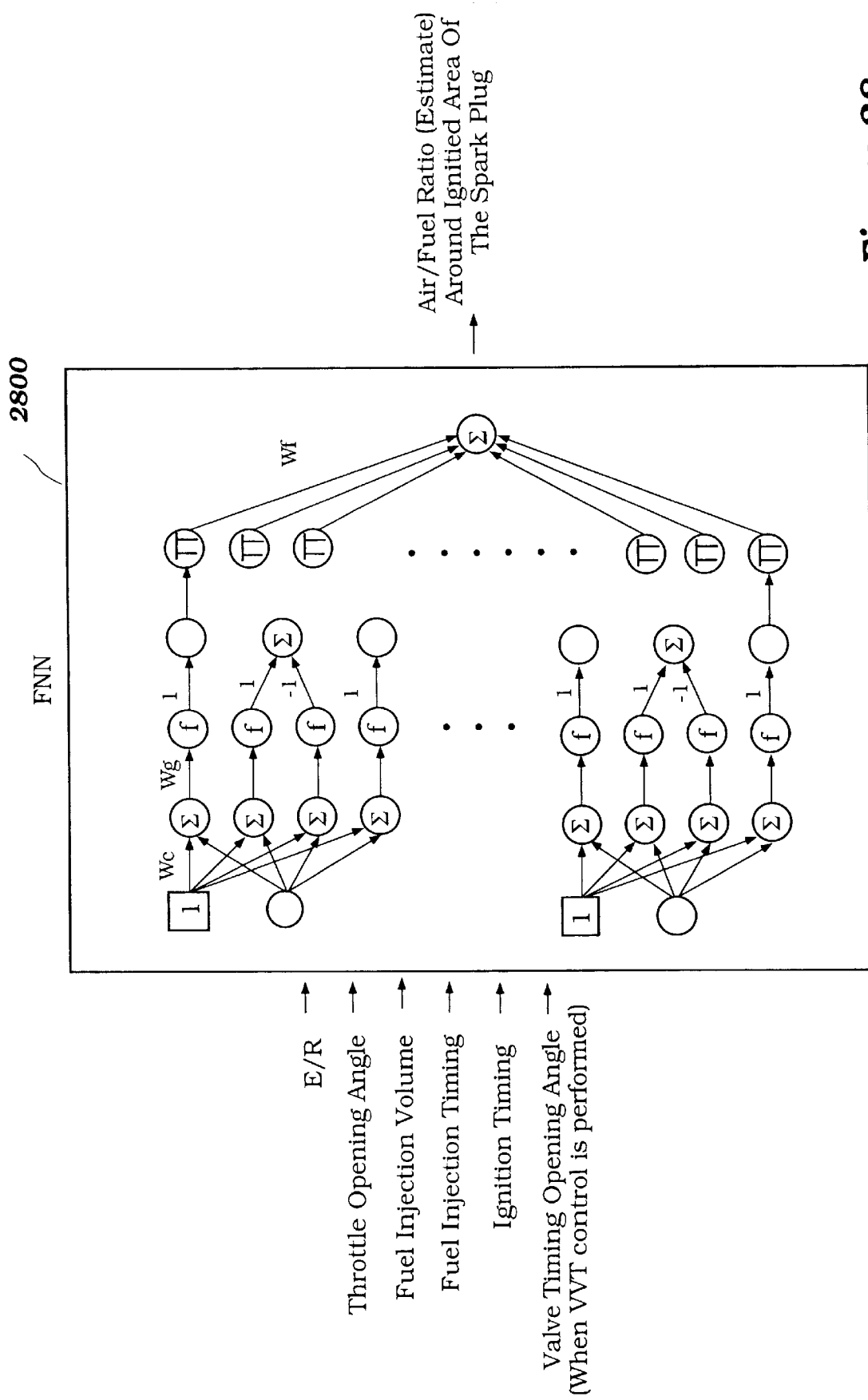
FIG. 28 shows an example of a neural network for estimating the air-fuel (A/F) ratio near the sparkplug ignition point.

FIG. 28 shows a FNN 2800 for estimating the air-fuel (A/F) ratio near the sparkplug ignition point. The FNN 2800 is similar in structure to the FNN 609 shown in FIG. 6, having six levels, three inputs, one output, and parameters $w_c$, $w_g$, and $w_f$. The FNN 2700 estimates the A/F ratio of the engine exhaust from data such as the engine speed, the throttle angle, the fuel injection volume, the fuel injection timing, the ignition timing, and the valve timing.

Figure 29:
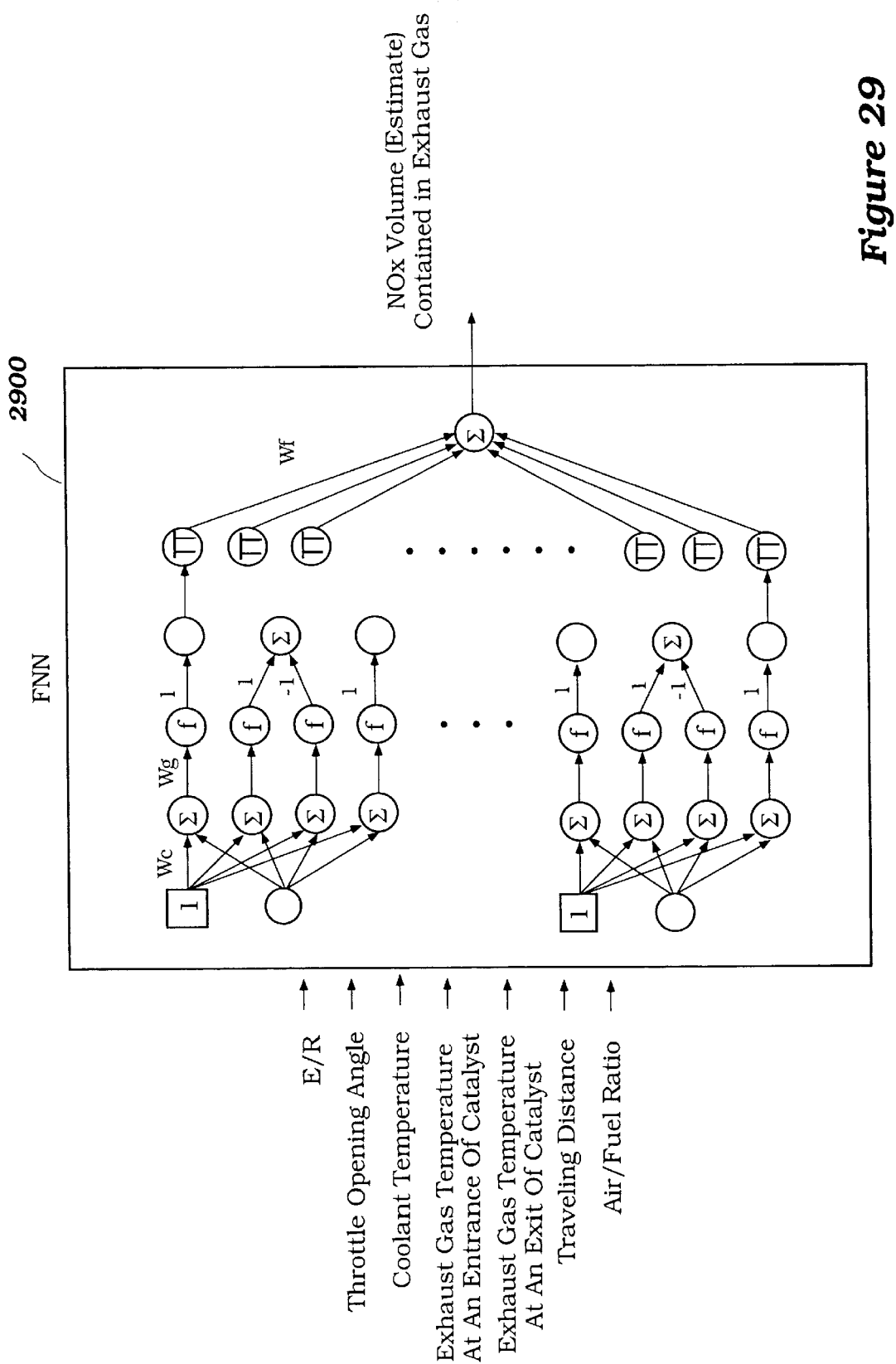
FIG. 29 shows an example of a neural network for estimating the amount of $NO_x$ in the exhaust gas in the exhaust catalyst system.

FIG. 29 shows a FNN 2900 for estimating the amount of $NO_x$ in the exhaust gas in the exhaust catalyst system. The FNN 2900 is similar in structure to the FNN 609 shown in FIG. 6, having six levels, and parameters $w_c$, $w_g$, and $w_f$. The FNN 2900 estimates the $NO_x$ content of the engine exhaust from data such as the engine speed, the throttle angle, the coolant temperature, the exhaust gas temperature at an input to the catalytic converter, the exhaust gas temperature at an output of the catalytic converter, the distance traveled, the A/F ratio (measured or estimated), etc.

Figure 30:
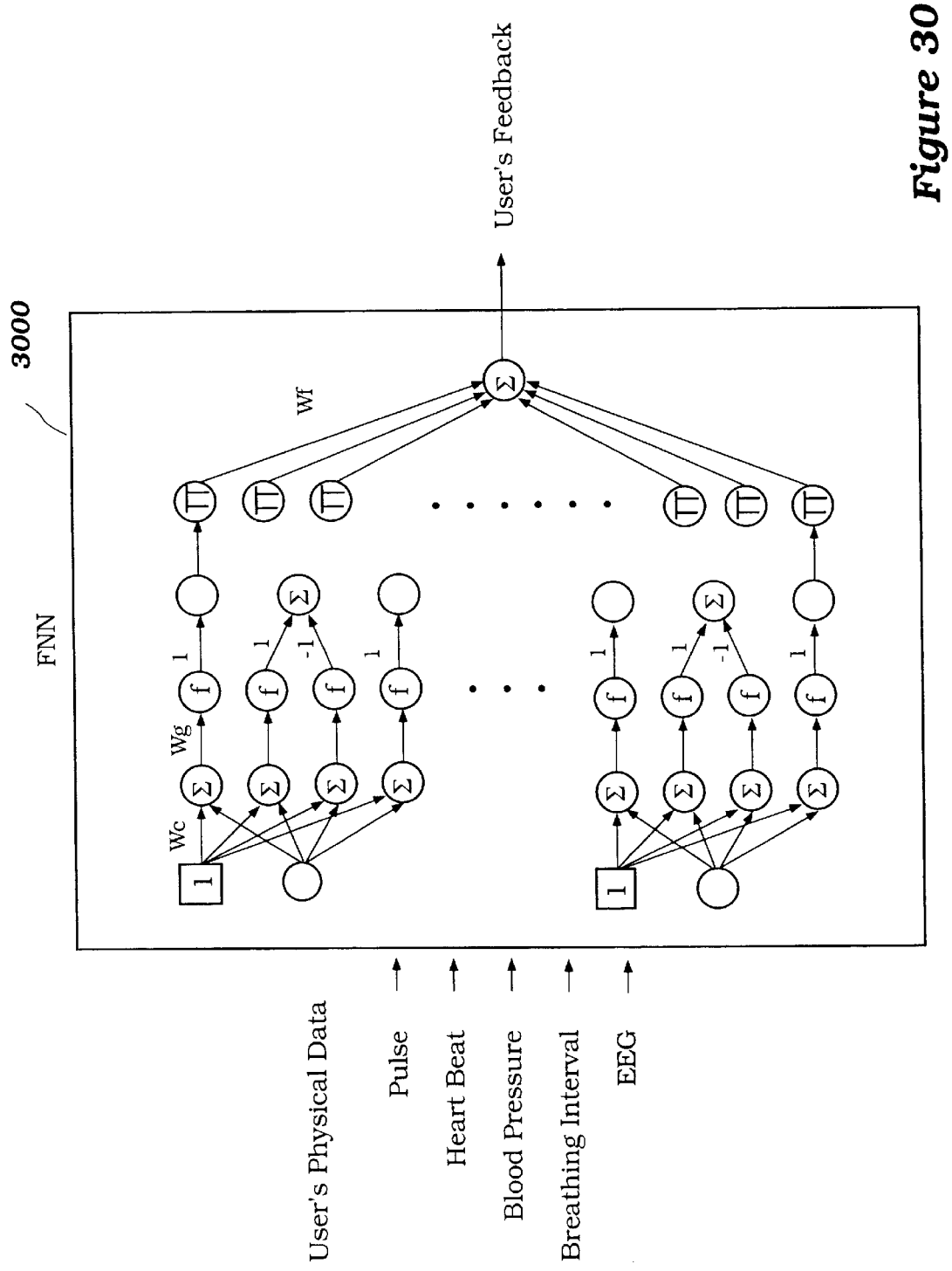
FIG. 30 shows an example of a neural network for estimating a user's sensory evaluation value.

FIG. 30 shows a FNN 3000 for estimating a user's sensory evaluation value. In the FNN 3000, user feedback is estimated from physiologic data taken from the user. The FNN 3000 is similar in structure to the FNN 609 shown in FIG. 6, having six levels, and parameters $w_c$, $w_g$, and $w_f$. The physiologic data includes parameters such as such as pulse, heart rate, blood pressure, breathing interval, electro-encepholograph (EEG), etc.

The FNN 2300, the FNN 2400, the FNN 2500, the FNN 2600, the FNN 2700, the FNN 2800, the FNN 2900 and the FNN 3000 can be optimized using a genetic algorithm as discussed in connection with FIGS. 6–8.

FIGS. 23–30 show the use of a FNN to estimate an unmeasured (unknown) engine parameter from measured engine parameters.

As shown in FIG. 25, the intake manifold wall temperature can be estimated by a FNN using at least one of the cooling water temperature, the oil temperature, and/or the engine (cylinder block) temperature as the input information.

As shown in FIG. 26, the exhaust air-fuel A/F ratio can be estimated by a FNN using input information including at least one of; a time sequential data of crank angular acceleration, the engine speed, the intake air rate, the intake air vacuum, the ignition timing, the opening and closing timings of intake and exhaust valves (when a variable valve timing device is used), and/or EGR valve opening (when EGR control is used).

As shown in FIG. 27, the exhaust air-fuel ratio can be estimated by a FNN using input information including at least one of; the exhaust temperature, the atmospheric temperature, the engine speed, the intake air rate, the intake air vacuum, the ignition timing, and/or the throttle valve opening.

As shown in FIG. 28 the air-fuel ratio around the plug ignition point in an in-cylinder injection type of engine can be estimated by a FNN using input information including at least one of; the engine speed (e.g., revolutions per minute), the throttle opening, the fuel injection rate, the fuel injection timing, the ignition timing, and/or the opening and closing timings of intake and exhaust valves when a variable valve timing device is used.

As shown in FIG. 29 the amount of $NO_x$ (oxides of nitrogen) in the exhaust gas in the exhaust catalyst system may be estimated with a fuzzy neural network using input information including at least one of; the engine speed, the throttle opening, the exhaust temperature at the inlet of the catalyst system, the exhaust temperature at the outlet of the catalyst system, the traveled distance, and/or the exhaust air-fuel (A/F) ratio.

A user's (e.g. a driver's) sensory evaluation value of the engine state may be estimated with a fuzzy neural network using input information including at least one of the user's pulse rate, blood pressure, breathing interval, and/or brain waves.

As described above a FNN can be used to estimate data values for engine operating parameters that are not directly measured by a sensor. The estimated data can be used for controlling the engine by providing the estimated data as control inputs (parameters) to an engine control system. The estimated parameters are typically estimated using a FNN, where the inputs to the FNN include data that are not necessarily used as the control parameters. In other words, data other than those used as the control parameters can be estimated and then used as the control parameters by: using the non-control data as the input information to the fuzzy neural network; using the output of the FNN as the control parameters, and teaching the FNN by optimizing the coupling factors and the number of the membership functions of the FNN. As a result, engine state data that might been difficult to use as the control parameters (e.g. data from sensors that are relatively expensive or relatively unreliable), can be estimated from data obtained by using relatively inexpensive sensors. Moreover, since the input information obtained from the relatively inexpensive sensors can be used to estimate more than one parameter, it is not necessary to provide a separate sensor for every estimated parameter.

For example, the intake air rate can be estimated using a relatively small, relatively inexpensive, vacuum sensor instead of using an airflow meter or a heat wire anemometer (which cannot be used in marine environments because of its high price, large size, and vulnerability to salt damage).

The rate of fuel injected from the fuel injectors and adhering to the intake manifold wall, and the rate of fuel evaporating from the fuel adhering to the intake manifold wall, can also be estimated. As a result, a sequential model of the engine can be provided.

FNN estimation is suitable for estimating parameters that show a non-linear relationship with the inputs. For example, the non-linear relationship between variation in torque and engine speed can be estimated by using a FNN as described above.

The combustion chamber temperature, which is difficult to measure directly, can be estimated using a FNN. The estimated combustion chamber temperature can be used as a control parameter to provide control of an engine, including control of the fuel injection rate according to the combustion temperature.

The intake manifold wall temperature, where the location to be measured changes according to the state of the engine operation, can be estimated with good accuracy corresponding to the engine operation state from moment to moment.

The exhaust air-fuel (A/F) ratio can be estimated using an existing, relatively inexpensive sensor instead of a relatively expensive air-fuel ratio sensor.

The air-fuel ratio around the plug ignition point in an in-cylinder injection type of engine can be estimated, thereby allowing the fuel injection rate into the cylinder to be controlled more accurately.

The amount of $NO_x$ compounds in the exhaust can be estimated, thereby allowing the engine to be controlled to improve combustion efficiency.

The sensory evaluation values of the user can be estimated according to information collected with existing sensors for collecting physiological data such as the user's pulse, heartbeat, blood pressure, breathing interval, brain waves, etc. Specifically, for example, in the case where the air-fuel ratio is controlled using an oxygen sensor, driveability of a vehicle can be maintained by controlling an $O_2$ feedback gain based on the sensory evaluation data (e.g., so that hunting of air-fuel ratio caused by the $O_2$ feedback is not felt by the user).

Although this invention has been described in terms of a certain embodiment, other embodiments apparent to those of ordinary skill in the art also are within the scope of this invention. Various changes and modifications may be made without departing from the spirit and scope of the invention. For example, one skilled in the art will recognize that the controllers, fuzzy neural networks, estimators and/or genetic algorithms described herein can be implemented in software, in hardware, or in combinations of hardware and software. The genetic algorithms can be run online (e.g., while the user is using the engine) or offline (e.g., at the factory). Parameters estimated by one FNN can be used as inputs to a subsequent FNN to estimate additional parameters. Accordingly, the scope of the invention is defined by the claims that follow.

What is claimed is:

1. An engine controller comprising: a control parameter output; a plurality of inputs configured to receive input information; and a fuzzy neural network configured to estimate said control parameter output from said input information to produce an estimated control parameter, said fuzzy neural network comprising a neural network and a fuzzy inference system, said fuzzy neural network trained by comparing said estimated control parameter with said control parameter to produce an error signal and training said fuzzy neural network to produce said estimated control signal in a manner that reduces said error signal.

2. The engine controller of claim 1, wherein said control parameter output comprises intake air volume, said controller further comprising a vacuum sensor.

3. The engine controller of claim 1, wherein said control parameter output comprises a fuel deposition rate in an intake manifold, said controller further comprising at least one of a tachometer, an intake air volume sensor and an intake vacuum sensor.

4. The controller of claim 1, wherein said control parameter output comprises an evaporation time constant in an intake manifold, said controller further comprising at least one of an intake manifold wall temperature sensor, an engine speed sensor, an intake air volume sensor and an intake vacuum pressure sensor.

5. The controller of claim 1, wherein said control parameter output comprises a torque fluctuation amount, and said input information comprises at least one of a fluctuation of an engine revolution speed, the engine revolution speed, an intake air volume and a time data for a combustion chamber pressure.

6. The controller of claim 1, wherein said control parameter output comprises a combustion chamber temperature, and said input information comprises at least one of an intake manifold wall temperature, an ambient air temperature and an elapsed time from the engine start.

7. The controller of claim 1, wherein said control parameter output comprises an intake manifold wall temperature, and said input information comprises at least one of a coolant temperature, a cylinder block temperature and an oil temperature.

8. The controller of claim 1, wherein said control parameter output comprises an air/fuel ratio, and said input information comprises at least one of a time data for a crank angle acceleration speed, an engine speed, an intake air volume, an intake manifold vacuum pressure, an ignition timing, an intake valve timing, and exhaust valve timing, and an EGR valve timing.

9. The controller of claim 1, wherein said control parameter output refers to an air/fuel ratio, and said input information comprises at least one of an exhaust gas temperature, an atmospheric temperature, an engine speed, an intake air volume, an intake vacuum pressure, an ignition timing and a throttle valve opening angle.

10. The controller of claim 1, wherein said control parameter output comprises an air/fuel ratio near a spark plug, said controller further comprising at least one of an engine speed sensor, and a throttle position sensor, said input data comprising at least one of a fuel injection volume, a fuel injection timing, an ignition timing, and an intake/exhaust valve timing.

11. The controller of claim 1, wherein said control parameter output comprises an amount of $NO_x$ components in an exhaust gas inside a catalyst system, and said input information comprises data from at least one of an engine speed, a throttle opening angle, a coolant temperature, a gas temperature at an input of said catalyst system, a gas temperature at an output of said catalyst system, a traveling distance, and an air/fuel ratio.

12. The controller of claim 1, wherein said control parameter output comprises user feedback for the engine operating condition, and said input information comprises at least one type of physiologic data such as a pulse, a heartbeat, a blood pressure, a breathing interval and an electroencephalogram (EEG).

13. The controller of claim 1, further comprising a genetic optimizer configured to optimize at least the number and types of input data for said fuzzy neural network by evolving an elite chromosome using a genetic algorithm based on an estimation accuracy.

14. An engine controller comprising a controller output; at least one input configured to receive input information; and estimator means for estimating said controller output from said input information by computing one or more membership functions, applying fuzzy rules to one or more results of said one or more membership functions, and combining one or more results of said fuzzy rules to produce a value for said controller output.

15. The engine controller of claim 14, further comprising optimizer means for optimizing said estimator means.

16. A data estimation method for engine control in which data for at least one engine condition is identified as a control parameter, the method comprising the steps of: measuring sensor data; providing said sensor data to a fuzzy neural network as input information to said fuzzy neural network; and estimating said control parameter for the engine condition by using said fuzzy neural network to produce an estimated control parameter, said fuzzy neural network comprising a neural network and a fuzzy inference system, said fuzzy neural network trained by comparing said estimated control parameter with said control parameter to produce an error signal and training said fuzzy neural network to produce said estimated control signal in a manner that reduces said error signal, thereby allowing said engine to be controlled by using said estimated control parameter in lieu of said control parameter.

17. The data estimation method of claim 16, wherein said control parameter comprises intake air volume and said input information comprises intake vacuum pressure of the engine.

18. The data estimation method of claim 16, wherein said control parameter comprises a fuel deposition rate in an intake manifold, and said input information comprises at least one of an engine rotational speed, an intake air volume and an intake vacuum.

19. The data estimation method of claim 16, wherein said control parameter comprises an evaporation time constant in said intake manifold, and said input information comprises at least one of an intake manifold wall temperature, an engine speed, an intake air volume and an intake vacuum pressure.

20. The data estimation method of claim 16, wherein said control parameter comprises a torque fluctuation amount, and said input information comprises at least one of a fluctuation of an engine revolution speed, the engine revolution speed, an intake air volume and a time data for a combustion chamber pressure.

21. The data estimation method of claim 16, wherein said control parameter comprises a combustion chamber temperature, and said input information comprises at least one of an intake manifold wall temperature, an ambient air temperature and an elapsed time from the engine start.

22. The data estimation method of claim 16, wherein said control parameter comprises an intake manifold wall temperature, and said input information comprises at least one of a coolant temperature, a cylinder block temperature and an oil temperature.

23. The data estimation method of claim 16, wherein said control parameter comprises an air/fuel ratio, and said input information comprises at least one of a time data for a crank angle acceleration speed, an engine speed, an intake air volume, an intake manifold vacuum pressure, an ignition timing, an intake valve timing, and an exhaust valve timing, and an EGR valve timing.

24. The data estimation method of claim 16, wherein said control parameter comprises an air/fuel ratio, and said input information comprises at least one of an exhaust gas temperature, an atmospheric temperature, an engine speed, an intake air volume, an intake vacuum pressure, an ignition timing and a throttle valve opening angle.

25. The data estimation method of claim 16, wherein said control parameter comprises an air/fuel ratio around an ignition location of a spark plug, and said input information comprises at least one of an engine rotational speed, a throttle opening angle, fuel an injection volume, a fuel injection timing, an ignition timing, and an intake/exhaust valve timing.

26. The data estimation method of claim 16, wherein said control parameter comprises an amount of $NO_x$ components in an exhaust gas inside a catalyst system, and said input information comprises at least one of an engine speed, a throttle opening angle, a coolant temperature, a gas temperature at an input of said catalyst system, a gas temperature at an output of said catalyst system, a traveling distance, and an air/fuel ratio.

27. The data estimation method of claim 16, wherein said control parameter comprises user feedback for the engine operating condition, and said input information comprises at least one type of physiologic data such as a pulse, a heart beat, a blood pressure, a breathing interval and an electroencephalogram (EEG).

28. The data estimation method of claim 16, further comprising the steps of: identifying said input information as an input candidate data to be used as input data for said fuzzy neural network; coding information regarding use of said candidate input data into chromosomes for use by a genetic algorithm; generating a plurality of individual chromosomes; and, optimizing at least the number and types of input data for said fuzzy neural network by evolving elite chromosomes using said genetic algorithm.

29. A data estimation method for engine control in which data for at least one engine condition is identified as an estimated parameter, the method comprising the steps of: obtaining input information from one or more sensors; providing said input information to one or more inputs of a fuzzy neural network; using said fuzzy neural network to estimate said estimated parameter; and obtaining said estimated parameter as an output of said fuzzy neural network, wherein said estimated parameter comprises a fuel deposition rate in an intake manifold, and said input information comprises at least one of an engine rotational speed, an intake air volume and an intake vacuum.

30. A data estimation method for engine control in which data for at least one engine condition is identified as an estimated parameter, the method comprising the steps of: obtaining input information from one or more sensors; providing said input information to one or more inputs of a fuzzy neural network; using said fuzzy neural network to estimate said estimated parameter; and obtaining said estimated parameter as an output of said fuzzy neural network, wherein said estimated parameter comprises an evaporation time constant in said intake manifold, and said input information comprises at least one of an intake manifold wall temperature, an engine speed, an intake air volume and an intake vacuum pressure.

31. A data estimation method for engine control in which data for at least one engine condition is identified as an estimated parameter, the method comprising the steps of: obtaining input information from one or more sensors; providing said input information to one or more inputs of a fuzzy neural network; using said fuzzy neural network to estimate said estimated parameter; and obtaining said estimated parameter as an output of said fuzzy neural network, wherein said estimated parameter comprises a torque fluctuation amount, and said input information comprises at least one of a fluctuation of an engine revolution speed, the engine revolution speed, an intake air volume and a time data for a combustion chamber pressure.

32. A data estimation method for engine control in which data for at least one engine condition is identified as an estimated parameter, the method comprising the steps of: obtaining input information from one or more sensors; providing said input information to one or more inputs of a fuzzy neural network; using said fuzzy neural network to estimate said estimated parameter; and obtaining said estimated parameter as an output of said fuzzy neural network, wherein said estimated parameter comprises a combustion chamber temperature, and said input information comprises at least one of an intake manifold wall temperature, an ambient air temperature and an elapsed time from the engine start.

33. A data estimation method for engine control in which data for at least one engine condition is identified as an estimated parameter, the method comprising the steps of: obtaining input information from one or more sensors; providing said input information to one or more inputs of a fuzzy neural network; using said fuzzy neural network to estimate said estimated parameter; and obtaining said estimated parameter as an output of said fuzzy neural network, wherein said estimated parameter comprises an intake manifold wall temperature, and said input information comprises at least one of a coolant temperature, a cylinder block temperature and an oil temperature.

34. A data estimation method for engine control in which data for at least one engine condition is identified as an estimated parameter, the method comprising the steps of obtaining input information from one or more sensors; providing said input information to one or more inputs of a fuzzy neural network; using said fuzzy neural network to estimate said estimated parameter; and obtaining said estimated parameter as an output of said fuzzy neural network, wherein said estimated parameter comprises an air/fuel ratio, and said input information comprises at least one of a time data for a crank angle acceleration speed, an engine speed, an intake air volume, an intake manifold vacuum pressure, an ignition timing, an intake valve timing, and an exhaust valve timing, and an EGR valve timing.

35. A data estimation method for engine control in which data for at least one engine condition is identified as an estimated parameter, the method comprising the steps of: obtaining input information from one or more sensors; providing said input information to one or more inputs of a fuzzy neural network; using said fuzzy neural network to estimate said estimated parameter; and obtaining said estimated parameter as an output of said fuzzy neural network, wherein said estimated parameter comprises an air/fuel ratio, and said input information comprises at least one of an exhaust gas temperature, an atmospheric temperature, an engine speed, an intake air volume, an intake vacuum pressure, an ignition timing and a throttle valve opening angle.

36. A data estimation method for engine control in which data for at least one engine condition is identified as an estimated parameter, the method comprising the steps of: obtaining input information from one or more sensors; providing said input information to one or more inputs of a fuzzy neural network; using said fuzzy neural network to estimate said estimated parameter; and obtaining said estimated parameter as an output of said fuzzy neural network, wherein said estimated parameter comprises an air/fuel ratio around an ignition location of a spark plug, and said input information comprises at least one of an engine rotational speed, a throttle opening angle, fuel an injection volume, a fuel injection timing, an ignition timing, and an intake/exhaust valve timing.

37. A data estimation method for engine control in which data for at least one engine condition is identified as an estimated parameter, the method comprising the steps of: obtaining input information from one or more sensors; providing said input information to one or more inputs of a fuzzy neural network; using said fuzzy neural network to estimate said estimated parameter; and obtaining said estimated parameter as an output of said fuzzy neural network, wherein said estimated parameter comprises an amount of $NO_x$ components in an exhaust gas inside a catalyst system, and said input information comprises at least one of an engine speed, a throttle opening angle, a coolant temperature, a gas temperature at an input of said catalyst system, a gas temperature at an output of said catalyst system, a traveling distance, and an air/fuel ratio.

* * * * *